United States Patent
Ishibashi et al.

(10) Patent No.: US 6,859,569 B2
(45) Date of Patent: Feb. 22, 2005

(54) INFORMATION RECEIVING/DISPLAY APPARATUS AND INFORMATION RECEIVING/DISPLAY METHOD

(75) Inventors: Akira Ishibashi, Tokyo (JP); Eriko Matsui, Kanagawa (JP); Hirotaka Akao, Tokyo (JP); Atsushi Toda, Kanagawa (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 09/822,123

(22) Filed: Mar. 30, 2001

(65) Prior Publication Data

US 2002/0046020 A1 Apr. 18, 2002

(30) Foreign Application Priority Data

Mar. 31, 2000 (JP) ...................................... P2000-101271

(51) Int. Cl.[7] .................................................. G02B 6/00
(52) U.S. Cl. ......................... 385/12; 385/125; 385/147; 385/901
(58) Field of Search ........................... 385/12, 125, 147, 385/901; 345/156

(56) References Cited

U.S. PATENT DOCUMENTS

| | | | | | |
|---|---|---|---|---|---|
| 4,220,016 A | * | 9/1980 | Frenger | ....................... | 63/14.9 |
| 4,640,592 A | * | 2/1987 | Nishimura et al. | ......... | 385/125 |
| 4,685,766 A | * | 8/1987 | Nishimura et al. | ......... | 385/125 |
| 4,919,981 A | * | 4/1990 | Levey et al. | ................... | 428/26 |
| 5,291,577 A | * | 3/1994 | Zoscak | ........................ | 385/147 |
| 5,398,070 A | * | 3/1995 | Lee | .............................. | 348/553 |
| 5,619,180 A | * | 4/1997 | Massimino et al. | ...... | 340/407.1 |
| 5,793,918 A | * | 8/1998 | Hogan | ......................... | 385/116 |
| 5,870,511 A | * | 2/1999 | Sawatari et al. | ............. | 385/12 |
| 5,889,901 A | * | 3/1999 | Anderson et al. | ............ | 385/12 |
| 6,088,017 A | * | 7/2000 | Tremblay et al. | ........... | 345/156 |
| 6,334,007 B1 | * | 12/2001 | Clark | ........................... | 385/12 |
| 6,377,721 B1 | * | 4/2002 | Walt et al. | .................... | 385/12 |
| 6,571,043 B1 | * | 5/2003 | Lowry et al. | ................ | 385/120 |
| 2001/0055462 A1 | * | 12/2001 | Seibel | .......................... | 385/147 |

FOREIGN PATENT DOCUMENTS

| | | | | | |
|---|---|---|---|---|---|
| JP | 10085315 A | * | 4/1998 | ............. | A61L/9/14 |
| JP | 2002123206 A | * | 4/2002 | ............. | G09F/27/00 |
| JP | 2003316299 A | * | 11/2003 | ............. | G09F/9/37 |

* cited by examiner

*Primary Examiner*—Brian Healy
*Assistant Examiner*—Daniel Petkovsek
(74) *Attorney, Agent, or Firm*—Sonnenschein, Nath & Rosenthal LLP

(57) ABSTRACT

An information receiving/display apparatus, which can receive and display third sensory information such as tactual information or olfactory information in addition to visual and/or audio information. A number of image display optical fibers and tactual representation fibers both having cores made of a liquid are arranged in alignment, and a number of image display control signal lines and tactual representation control signal lines made of piezoelectric element are aligned across the fibers, thereby to form the information receiving/display apparatus.

17 Claims, 20 Drawing Sheets

SCATTERED LIGHT

INPUT VOLTAGE

LASER BEAM 5, 3, 4, 1 PIXEL, 16, 2, 1, 3

R G B — FOR IMAGE DISPLAY

FOR OLFACTORY REPRESENTATION

FOR TACTUAL REPRESENTATION 16, 16b, 16a

SMELL

SCATTERED LIGHT

INFORMATION RECEIVING/DISPLAY APPARATUS AND INFORMATION RECEIVING/DISPLAY METHOD

RELATED APPLICATION DATA

The present application claims priority to Japanese Application No. P2000-101271 filed Mar. 31, 2000, which application is incorporated herein by reference to the extent permitted by law.

BACKGROUND OF THE INVENTION

This invention relates to an information receiving/display apparatus and an information receiving/display method, especially those based on a novel operation principle.

Modern information transmission started with remote transmission of audio information together with appearance of radio receivers as information receiving equipment. That is, radio receivers are means for transmitting audio information (sound) to people at remote locations and invoke their auditory sense to give them information. Subsequent to radios, television sets were invented as information receiving equipment. Television systems are means for transmit visual information (images) and auditory information (sounds) as electric waves to people at remote locations and invoke their visual sense and auditory sense to give them information.

Humans have five senses, namely, visual sense, auditory sense, olfactory sense, gustatory sense and tactile sense. However, modern information transmission has dealt with visual information and auditory information only, and transmission of the remainder olfactory information, gustatory information and tactile information has not yet been realized.

Even if it is tried to implement current television sets with the function of receiving and displaying at least one of olfactory information, gustatory information and tactile information, gustatory sense and tactile sense are proximately discernible senses humans can perceive something when directly touching it (distance 0), and incompatible with TV. Therefore, such implementation is impossible. Also regarding olfactory information, since chemical properties cannot be decomposed and recomposed, unlike three primary colors (RGB) of visual information, it is basically difficult to implement TV sets with the function of receiving and displaying olfactory information. Moreover, since olfactory receptors are considered to amount as many as the order of $N=10^6$, basic chemical cells as many as N or $N^{1/2}$ have to be prepared for reproduction of olfactory information, and this is extremely difficult in the present situation. Also from this point of view, reception and display of olfactory information are difficult.

Difficulty in implementing TV sets with the function of receiving and displaying sensory information lies in not having a display with a flexible plane. That is, when people touch screens of CRT displays, which are currently the most widely distributed displays, they merely discern cold and hard texture of glass. Although there is a recent development of a system enabling a user to trace the screen with a finger, the user can perceive only a rough stereognostic contour therefrom, and there are not techniques that provide remote reproduction of delicate tactile texture of surfaces. Additionally, it is basically impossible to touch images displayed on CRT display screens from their backs. Although liquid crystal displays (LCD) and plasma display panels (PDP) have recently come to be introduced in lieu of CRT displays, the above-reviewed conditions have not been changed yet with them.

As reviewed above, although humans fortunately have five senses, namely, three remotely discernible senses (visible sense, auditory sense, olfactory sense) and two proximately discernible senses (tactile sense, gustatory sense), what can be actually transmitted has been limited to audio-visual information. Although there is a trial to synthesize voices from movements of faces, this is not but mere introduction of auditory information from visual information, and does not break through the category of audio-visual techniques.

In the era of progressively high-leveled networks, those information communication techniques, which are rather lopsided, involve the possibility of rendering humans quasi-malnourished and inviting hazards from the standpoints of maintaining or developing salutary sensory functions, and further from the standpoint of brain evolution.

OBJECTS AND SUMMARY OF THE INVENTION

It is therefore an object of the invention to provide an information receiving/display apparatus and an information receiving/display method that enable reception and display of third sensory information, such as tactile information or olfactory information, in addition to visual information and/or auditory information.

Another object of the invention is to provide a an information receiving/display apparatus and an information receiving/display method that are simple in structure, easy to increase the scale of the information display area, unlikely to produce distortion along edges of the information display area during reproduction of a large solid angle image when the information display area is large-scaled, quickly responsive, capable of changing the shape of the information display plane to various shaped including a concave shape, if necessary, extendible, light, thin and flexible.

According to the first aspect of the invention, there is provided an information receiving/display apparatus configured to receive information for at least one of remotely discernible senses and information for at least one of proximately discernible senses, and display them on an information display plane.

According to the second aspect of the invention, there is provided an information receiving/display method characterized in receiving information for at least one of remotely discernible senses and information for at least one of proximately discernible senses, and displaying them on an information display plane.

In the first and second aspects of the invention, the remotely discernible sense is visual sense, auditory sense or olfactory sense, and the proximately discernible sense is tactual sense or gustatory sense. For example, at least two of information for remotely discernible senses and said information for proximately discernible senses are given as functions of positions on the information display plane. Additionally, information of sound, surface roughness, relative surface temperature or relative surface humidity, for example, is represented on the information display plane in addition to image information. Typically, the information display plane is made of an optical fiber or an optical waveguide having a liquid core, and a fiber having a liquid cores, and image information is displayed by scattering light introduced into said core from one end or opposite ends of said optical fiber or waveguide by means of light scattering elements in said core at a selected portion in response to an image to be displayed, and thereby leading out it externally. It should be especially remarked that the information for at least one of proximately discernible senses can be obtained from both the front and the back of the information display plane.

According to the third aspect of the invention, there is provided an information receiving/display apparatus configured to receive sensory information other than visual information and audio information, in addition to visual information and/or audio information, and display it on an information display plane.

According to the fourth aspect of the invention, there is provided an information receiving/display method characterized in receiving sensory information other than visual information and audio information, in addition to visual information and/or audio information, and displaying it on an information display plane.

In the third and fourth aspects of the invention, the visual information, audio information other sensory information are given as functions of positions on the information display plane. The other sensory information is tactual information, relative temperature information or olfactory information. The other sensory information is typically composed of image information. More specifically, the other sensory information is tactual information, for example, and the tactual information is composed of image information. Alternatively, the other sensory information is relative surface temperature information or relative surface humidity information, and the relative surface temperature information or relative surface humidity information is composed of image information. Typically, the information display plane is made by using an optical fiber or optical waveguide having a liquid core, and a fiber having a liquid core. The image information is typically displayed by scattering light introduced into the core from one end or opposite ends of the optical fiber or waveguide by means of light scattering elements in the core at a portion selected in response to an image to be displayed, and thereby leading out it externally.

According to the fifth aspect of the invention, there is provided an information receiving/display apparatus configured to receive sensory information other than visual information and audio information, in addition to visual information and/or audio information, and display it on an information display plane, wherein the information display plane comprises:

an optical fiber or an optical waveguide having a liquid core for visual information; and a fiber for information for another sensory information having a liquid core, image information being displayed by scattering light introduced into the core from one end or opposite ends of the optical fiber or waveguide by means of light scattering elements in the core at a portion selected in response to an image to be displayed, and thereby leading out it externally, a projection being formed or a temperature change being produced on a surface of the fiber at a portion selected in response to image information to be displayed, and/or, a liquid forming the liquid core or molecules of a substance contained in the liquid being emanated from a surface of the fiber at a portion selected in response to image information to be displayed.

According to the sixth aspect of the invention, there is provided an information receiving/display apparatus characterized in receiving sensory information other than visual information and audio information, in addition to visual information and/or audio information, and displaying it on an information display plane, wherein the information display plane comprises:

an optical fiber or an optical waveguide having a liquid core for visual information; and a fiber for information for another sensory information having a liquid core, image information being displayed by scattering light introduced into the core from one end or opposite ends of the optical fiber or waveguide by means of light scattering elements in the core at a portion selected in response to an image to be displayed, and thereby leading out it externally, a projection being formed or a temperature change being produced on a surface of the fiber at a portion selected in response to image information to be displayed, and/or, a liquid forming the liquid core or molecules of a substance contained in the liquid being emanated from a surface of the fiber at a portion selected in response to image information to be displayed.

In the fifth and sixth aspects of the invention, typical light scattering elements are bubbles. Explanation is made here about generation of the bubbles by a piezoelectric element. That is, in general, when ultrasonic waves generated by a piezoelectric element are propagated, a liquid swings and begins to perform its power of scattering light due to local variance in density. However, this local variance in density is a continuous change, and its light scattering power is not high. In order to enhance the light scattering power, it will be effective to introduce dissolved gas as a guest into a host liquid, evaporate it with ultrasonic waves and thereby bring about multi-refraction along the well-defined (and therefore producing a large discontinuity in refractive index) boundary between the gas and the liquid. In this case, however, since generated bubbles do not disappear soon (which results in early loosing the dissolved gas), this technique cannot be used in the display apparatus.

To overcome the problem, it is effective to use cavitation for generating bubbles. By using a host liquid having an appropriate vapor pressure and ultrasonic waves of an appropriate intensity, bubbles are generated by cavitation. This is a critical process, and bubbles are made of molecules of the host liquid. Therefore, the process can be repeated quickly.

In response to the saturation vapor pressure of the liquid, sound pressure on the outer circumferential surface of the optical fiber or optical waveguide given from the piezoelectric element, and the distance from the core center axis, cavitation is brought about near the core center axis, bubbles of vapor of the liquid can be generated. Refractive index of a liquid, in general, is about 1.3 through 1.9, and that of the bubbles is approximately 1. Therefore, light can be scattered very efficiently by bubbles.

When the cavitation number is $C_n$ (dimensionless number), it can be expressed as:

$$C_n = (p_0 - p')/(\rho v^2/2) \qquad (1)$$

where $p_0$ is the pressure in a still liquid, $p'$ is the saturation vapor pressure of the liquid, $\rho$ is the density of the liquid, and $v$ is the velocity of an object. Near an object moving sufficiently fast in a liquid, the pressure drops according to the Bernoulli's law to a value smaller than the saturation vapor pressure of the liquid, it may occurs that $C_n$ becomes negative. That is, the following inequality $$C_n \propto p_0 - p' < 0 \qquad (2)$$

is the criterion about whether cavitation occurs or not. In a state where cavitation has occurred, a liquid vaporizes and generates bubbles. At that time, in case of a ship, power of the screw does not work on water, and the ship cannot run fast. This vaporization is known to occur also when intensive ultrasonic waves are used, and the present invention uses this phenomenon.

In the fifth and sixth aspects, the bubbles as the light scattering elements are generated by propagating ultrasonic waves from the outer circumferential surface toward the center axis of the optical fiber or optical waveguide by means of, for example, a piezoelectric element provided on the outer circumferential surface of the optical fiber or optical waveguide. When using the piezoelectric element for this purpose, the bubbles can be controlled in size by controlling the voltage applied to the piezoelectric element and thereby controlling the intensity of ultrasonic waves. The size of the bubbles can be controlled to exhibit substantially symmetrical distribution about the center axis of the optical fiber by making the piezoelectric element to encircle a large part of the circumferential surface of the optical fiber. Light introduced into the optical fiber or optical waveguide may be generated from a light source provided outside the display apparatus; however, it is typically generated from light sources provided at one-side ends or opposite ends of a plurality of optical fibers or optical waveguides. Although semiconductor lasers are appropriate as these light sources, light emitting diodes or super luminescent light may be used as well.

In the fifth and sixth aspects of the invention, light scattering elements may be fine particles. In this case, fine particles may be controlled in position by propagating ultrasonic waves from outer circumferential surfaces of optical fibers or optical waveguides toward their center axes. Alternatively, these fine particles may be controlled in position and/or orientation by introducing an optical field from optical control elements provided on outer circumferential surfaces of the optical fibers or optical waveguides into the optical fibers or optical waveguides. The use of scattered light by scattering light by means of fine particles dispersed as foreign matters (guest) in the liquid is advantageous because vibration of the fine particles (guest) and swinging movements of the liquid (host) can be controlled independently.

According to the seventh aspect of the invention, there is provided an information receiving/display apparatus configured to receive visual information and another sensory information other than visual information and audio information, in addition to visual information and/or audio information or in addition to visual information and audio information, and display it on an information display plane, wherein the information display plane comprises:

a plurality of optical fibers or optical waveguides having liquid cores for visual information;

a plurality of fibers for information for another sensory information having liquid cores;

a plurality of first control signal lines for visual information extending across the optical fibers or optical waveguides; and a plurality of second control signal lines for the other sensory information extending across the fibers, first piezoelectric elements being provided on outer circumferential surfaces of the optical fibers or optical waveguides at intersections between the optical fibers or optical waveguides and the first control signal lines, second piezoelectric elements being provided on outer circumferential surfaces of the fibers at intersections between the fibers and the second control signal lines, image information being displayed by scattering light introduced into the cores from one end or opposite ends of selected one of the optical fibers or waveguides selected in response to image information to be displayed, by means of bubbles that are generated by cavitation brought about in a liquid forming the core by propagating ultrasonic waves from the outer circumferential surface of the optical fiber or optical waveguide by driving the first piezoelectric element at the intersection between the selected optical fiber or optical waveguide and one of the first control signal lines selected in response to the image information to be displayed, and leading out the scattered light externally, a projection being formed or a temperature change being produced on a surface of one of the fibers selected in response to the image information to be displayed, by propagating ultrasonic waves from the outer circumferential surface of the selected fiber by driving one of the second piezoelectric elements at the intersection between the selected fiber and one of one of the second control signal lines selected in response to the image information to be displayed, and/or, the liquid forming the liquid core or molecules of a substance contained in the liquid being emanated from the surface of one of the fibers selected in response to the image information to be displayed.

In the seventh aspect of the invention, one of the piezoelectric elements at the intersection between the selected fiber and the selected second control signal line is driven to propagate ultrasonic waves from the outer circumferential surface of the fiber and thereby bring about cavitation and generate bubbles in the liquid forming the core, such that a projection is made as representation of tactual information on the surface of the fiber due to a pressure of bubbles. Alternatively, one of the piezoelectric elements at the intersection between the selected fiber and the selected second control signal line to propagate ultrasonic waves from the outer circumferential surface of the fiber to increase the temperature of the liquid forming the core as representation of relative surface temperature information. Alternatively, one of the piezoelectric elements at the intersection between the selected fiber and the selected second control signal line to propagate ultrasonic waves from the outer circumferential surface of the fiber to emanate the liquid forming the core or molecules of a substance contained in the liquid as representation of relative surface humidity information or olfactory information.

In the seventh aspect of the invention, the bubbles can be controlled in size by controlling the voltage applied to the piezoelectric element and thereby controlling the intensity of ultrasonic waves. The size of the bubbles can be controlled to exhibit substantially symmetrical distribution about the center axis of the optical fiber by making the piezoelectric element to encircle a large part of the circumferential surface of the optical fiber. Light introduced into the optical fiber or optical waveguide may be generated from a light source provided outside the display apparatus; however, it is typically generated from light sources provided at one-side ends or opposite ends of a plurality of optical fibers or optical waveguides. Although semiconductor lasers are appropriate as these light sources, light emitting diodes or super luminescent light may be used as well.

In the seventh aspect of the invention, in case of designing the information receiving/display apparatus as a full-color display, the optical fibers include those for red, those for green and those for blue. The optical fibers for red have red emitting light sources at one-side ends or opposite ends thereof, the optical fibers for green have green emitting light sources at one-side ends or opposite ends thereof, and the optical fibers for blue have blue emitting light sources at one-side ends or opposite ends thereof. Although semiconductor lasers are appropriate as these light sources, light emitting diodes or super luminescent light may be used as well.

In the seventh aspect of the invention, the optical fibers, or optical waveguides, and the fibers are arranged to form a concave plane as a whole, which is preferably curved normally to these optical fibers and fibers.

In the seventh aspect of the invention, the light scattering elements are evaporated molecules of a liquid having a high vapor pressure, such as alcohol.

In the present invention, diameter of each optical fiber is determined in accordance of its desired use. Typically, however, it is in the order of mm or smaller. Also in case of using an optical waveguide, its size may be equivalent to that. Diameter of the fiber may be determined independently from those, but it may be approximately equal to that of the optical fiber, for example.

According to the invention having the above-summarized constructions, it is possible to transmit (broadcast) third sensory information, such as tactual information or olfactory information, in addition to visual information and/or audio information, and realize information transmission effectively activating human five senses.

Especially when the information display plane is made by using optical fibers, or optical waveguides, having liquid cores, and fibers having liquid cores, the information display plane can be simplified in structure, easily enlarged in size, and it is very extendible. Additionally, by curving the plane made up of the optical fibers, or optical waveguides, and fibers to form a display plane with a desired shape, topology of the display plane can be controlled easily. Further, since optical fibers, or optical waveguides, and fibers are thin, light and flexible, a thin, light and flexible information receiving/display apparatus can be made. Furthermore, since light introduced into cores from one-side ends or opposite ends of optical fibers or optical waveguides by means of light scattering elements in the core at selected portion of in response to an image to be displayed, and leading out the scattered light externally to display the image, the display plane is unlikely to produce distortion in the image along its edges during reproduction of a large three-dimensional image, especially when the information display plane is large-scaled, and at the same time, it is quick in response.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
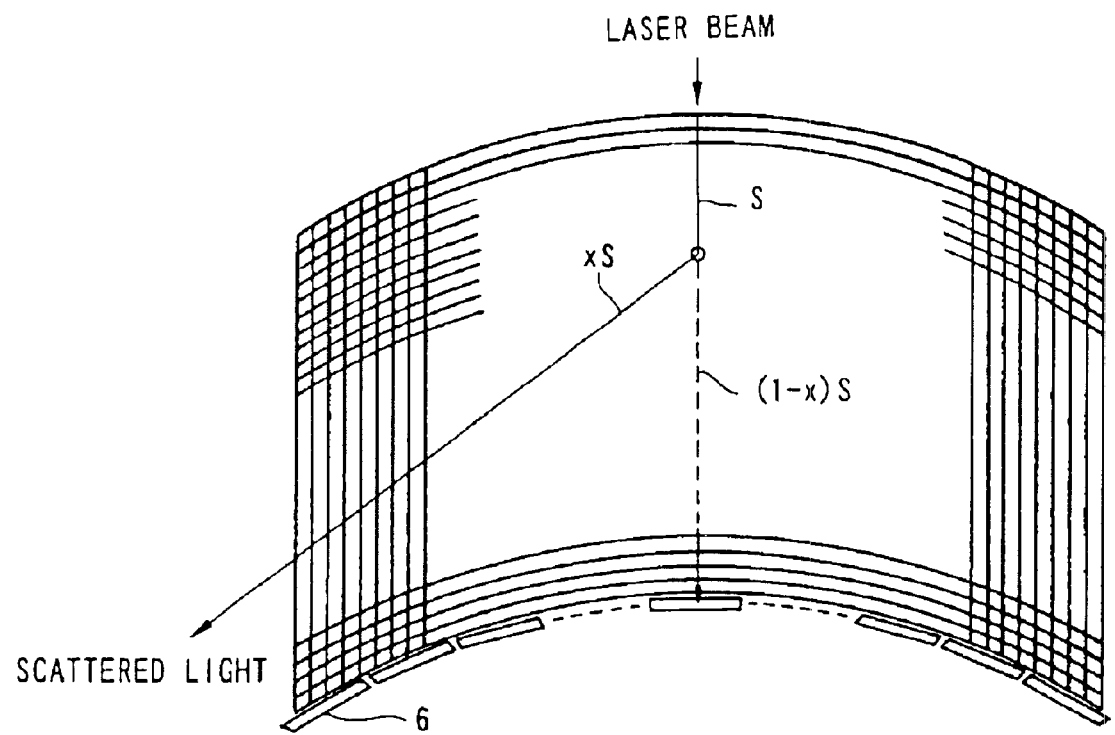
FIG. 1 is a schematic diagram that shows entire configuration of a flat color display having a tactual representation function according to the first embodiment of the invention.

Preferred embodiments of the invention will be described below with reference to the drawings. In all figures illustrating the embodiments, the same or equivalent parts or components are labeled with common reference numerals.

Figure 2:
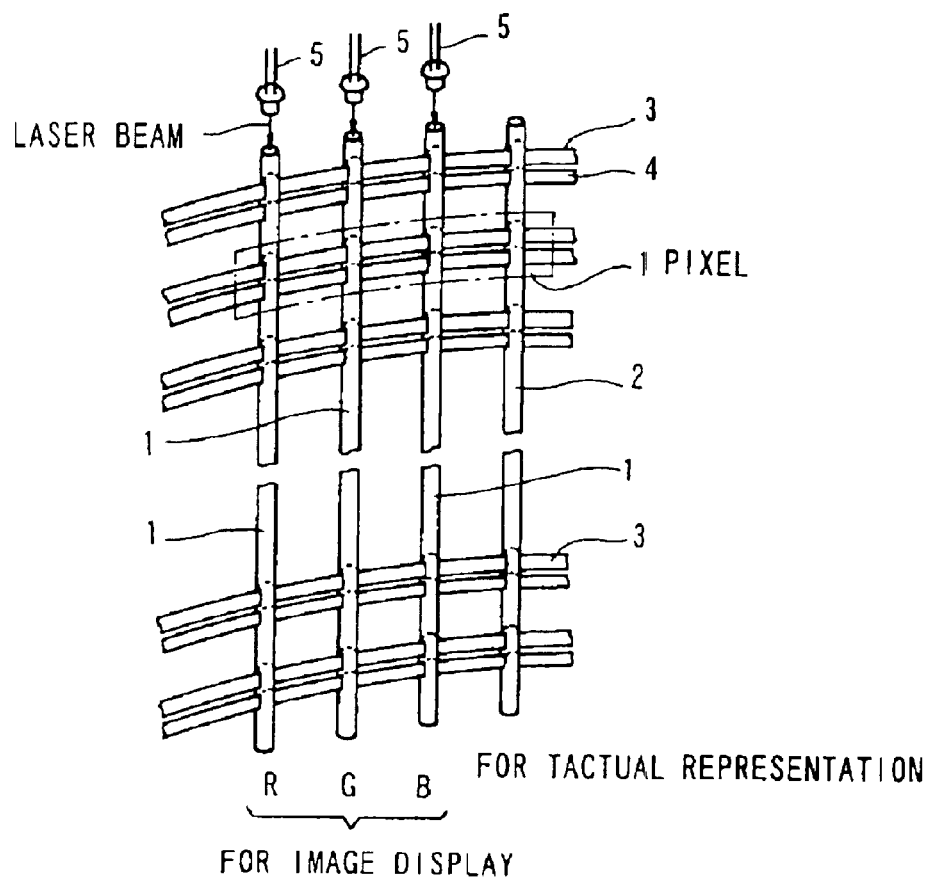
FIG. 2 is a schematic diagram that shows a part of the flat color display having the tactual representation function according to the first embodiment of the invention in an enlarged scale.

FIG. 1 shows entire configuration of a flat color display having a tactual representation function according to the first embodiment of the invention. FIG. 2 shows a part of the flat color display having the tactual representation function in an enlarged scale.

As shown in FIGS. 1 and 2, the flat color display having the tactual representation function is made up of a plurality of straight optical fibers 1 for visual representation, i.e. for image display, a plurality of straight fibers 2 for tactile representation, which both are aligned in parallel, and a plurality of straight control signal lines 3 for image display and a plurality of straight control signal lines 4 for tactile representation, which both are aligned in parallel in the direction normal to the optical fibers 1 and fibers 2, so as to form a rectangular sheet, and the entirety is curved to in the lengthwise direction of the control signal lines 3 and 4 to form a concave display plane. The number of optical fibers 1 depends on the number of pixels aligned in the lengthwise direction of the control signal lines 3 and 4. More specifically, three optical fibers 1 are provided per pixel for R (red), G (green) and B (blue), respectively, and 3N optical fibers 1 are provided in total (N=1, 2, 3, . . . ). Each of the optical fibers 2 corresponds to three optical fibers 1 for each of the pixels aligned in the lengthwise direction of the signal lines 3 and 4, and its total number is N. The number of control signal lines 3 and that of control signal lines 4 are equal to the number of pixels aligned in the lengthwise directions of the optical fibers 1 and 2, respectively.

At one-side ends of the R, G and B optical fibers 1 (upper ends in FIGS. 1 and 2), semiconductor lasers 5 are provided as light sources such that laser beams can be introduced from these semiconductor lasers 5 into cores from the end surfaces of the optical fibers 1. Used as the semiconductor lasers 5 for R, G and B optical fibers 1 are those for red light emission, green light emission and blue light emission, respectively. More specifically, An AlGaInP compound semiconductor laser may be used as the semiconductor laser 5 for red light emission, a ZnSe compound semiconductor laser may be used as the semiconductor laser 5 for green light emission, and a GaN compound semiconductor laser may be used as the semiconductor laser 5 for blue light emission.

At the other ends of the R, G and B optical fibers 1 (lower ends in FIGS. 1 and 2), CCD line sensors 6 (FIG. 1), for example, are provided as photo detectors such that each is shared by a plurality number of pixels aligned in the lengthwise direction of the control signal lines 3 and 4 to detect laser beams emitted from the other ends of these optical fibers 1. In association with each CCD line sensor 6, a shift register (not shown) is provided. Thus, signals by each horizontal scan of the control signal lines 3 are input as laser beams into the CCD line sensors 6, and the input pieces of information are sequentially stored in the shift registers to store information of one screen (one frame). It should be noted here that the light emitted from the other ends of the optical fibers 1 and entering into the CCD line sensors 6 have a complementary relation with the light extracted as the light for display. That is, when S represents the quantity of incident light from one side of an optical fiber 1 and a ratio x is externally led out by scattering, the quantity of scattered light is xS, and the quantity of emitted light from the other end of the optical fiber 1 is (1−x)S. Therefore, image information stored in the shift register is in a complementary relation with the image information displayed. In other words, image information stored in the shift register and the image information displayed have a relation similar to positive-and-negative with respect to the variable x. Regarding the variable S, they have a proportional relation.

The semiconductor laser 5 at one end of each optical fiber 1 and the control signal line 3 can be driven in response to image signals by a horizontal drive circuit and a vertical drive circuit, both not shown. Similarly, the control signal line 4 and the fiber 2 can be driven in response to image signals by a horizontal drive circuit and a vertical drive circuit, both not shown.

Figure 3:
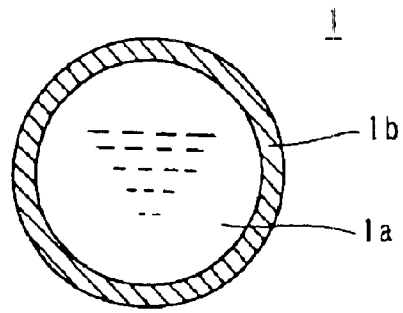
FIG. 3 is a cross-sectional view of an optical fiber that forms the flat color display having the tactual representation function according to the first embodiment of the invention.

FIG. 3 shows a cross-sectional structure of each optical fiber 1. As shown in FIG. 3, each optical fiber 1 is made up of a liquid core 1a, and a solid cladding 1b around the core 1a. The liquid forming the core 1a is selected depending on the intended use. For example, water and ethyl alcohol with ultra fine oxide particles dispersed therein in accordance with the refractive index of the cladding 1a, for example, are suitable materials. As the material of the cladding 1b, plastics or glass, typically used as materials of optical fibers, may be used. The optical fiber 1 can be made by preparing a thick plastic preform confining a liquid in a central portion and then expanding it, or by introducing a liquid into the cavity of a hollow optical fiber, for example.

Figure 4:
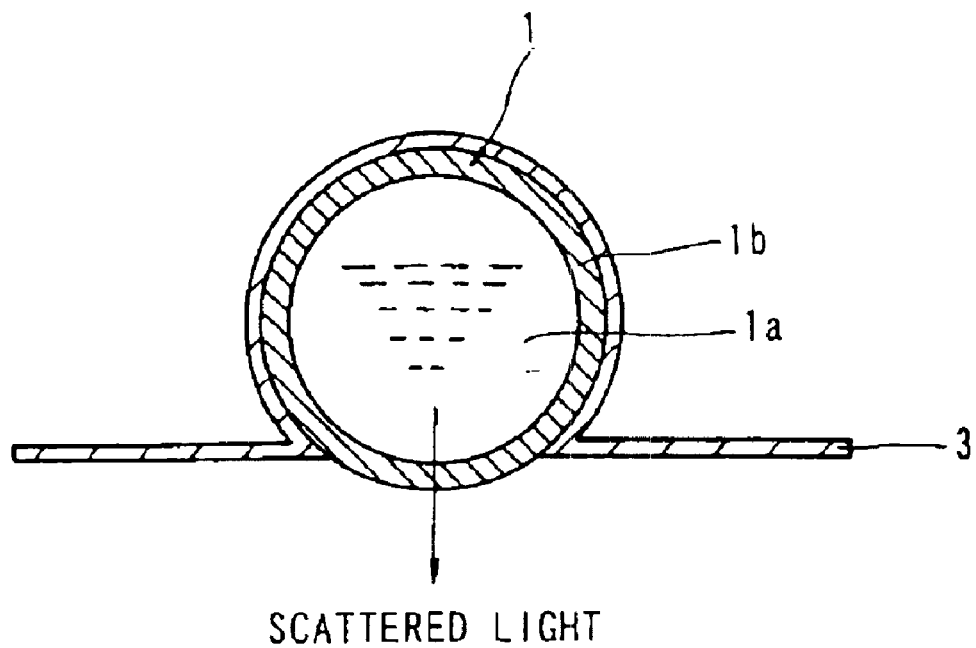
FIG. 4 is a cross-sectional view of an intersection point of an optical fiber and a control signal line in the flat color display having the tactual representation function according to the first embodiment of the invention.
Figure 5:
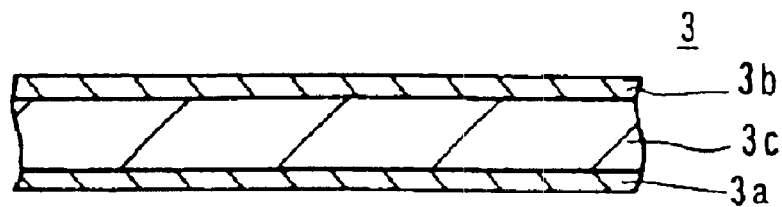
FIG. 5 is a cross-sectional view that shows configuration of a control signal line forming the flat color display having the tactual representation function according to the first embodiment of the invention.

FIG. 4 is a cross-sectional view of an intersection point of an optical fiber 1 and a control signal line 3. As shown in FIG. 4, at each intersection point between the control signal line 3 and the optical fiber 1, the control signal line 3 defines a concave surface in contact with the outer circumferential surface of the optical fiber 1 excluding a part of the circumference facing the display plane of the display. As shown in FIG. 5, the control signal line has a piezoelectric element structure in which a piezoelectric material 3c is sandwiched by a pair of metal electrodes 3a and 3b, and the lower metal electrode 3a is in contact with the outer circumferential surface of the optical fiber 1. In this case, the surface of the control signal line 3 made of the piezoelectric element in contact with the cladding 1b is the surface of the metal electrode 3a, which has a high reflectance. Therefore, light scattered in the core 1a is efficiently led out externally from the portion not covered by the control signal line 3. As a method of applying a voltage to the piezoelectric element, there is the method of grounding one of the metal electrodes 3a, 3b and applying a positive voltage to the other, for example. Usable as the piezoelectric material 3c of the piezoelectric element are, for example, polycrystalline or ceramic materials like $PbTiO_3$, PZT, PLZT, ZnO, and polymers like polyvinylidene fluoride (PVDF). There are some methods usable for making the control signal line 3 in form of the piezoelectric element, such as the method usable when using a polycrystalline or ceramic material as the piezoelectric material 3c and configured to first arrange optical fibers 1 in parallel and then sequentially stack a metal, piezoelectric material and metal through an appropriate mask by sputtering, vacuum evaporation, screen printing, or the like, and the method usable when using PVDF as the piezoelectric material 3c and configured to first prepare a multi-layered film stacking metal films on opposite surfaces of a PVDF film and then bond stripe-shaped cutout pieces thereof onto outer circumferential surfaces of the optical fibers 1.

Diameter of each optical fiber 1 is 200 through 300 $\mu$m, for example, and width of the control signal line 3, i.e. the width of the piezoelectric element (corresponding to the length of each pixel in the lengthwise direction of the optical fiber 1), is about 1 mm, for example. In order to bring about effective light scattering in the lengthwise direction of the optical fiber 1, since length L of the bubble generating region in the core 1a in the lengthwise direction of the optical fiber 1 may be only ~$\mu$m, the width around 1 mm is a sufficiently large value as the width of the piezoelectric element.

In the first embodiment, ultrasonic waves are generated using the piezoelectric elements forming the control signal lines 3 in contact with outer circumferential surfaces of the optical fibers 1 as an oscillator so as to induce cavitation and generate bubbles in the liquid cores 1a due to the ultrasonic waves. These procedures will be explained below more specifically.

Figure 6:
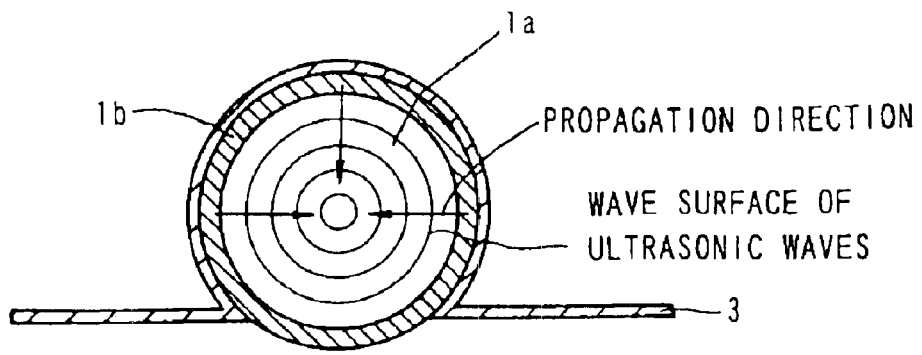
FIG. 6 is a cross-sectional view that shows an aspect of propagation of ultrasonic waves to an optical fiber in the flat color display having the tactual representation function according to the first embodiment of the invention.

FIG. 6 shows an aspect inside the optical fiber 1 in which ultrasonic waves are generated by using the control signal line 3 of the piezoelectric element as an oscillator. As shown in FIG. 6, ultrasonic waves radiated due to oscillation of the piezoelectric element and propagating through the optical fiber 1 gradually constrict as going closer the center axis of the optical fiber 1 because the contact surface of the piezoelectric element with the optical fiber 1 is a concave plane. At that time, representing the intensity of the sonic waves at the position distant by r from the center axis of the optical fiber 1 by I(r) [W/m$^2$], it can be expressed as:

$$I(r)=I_{rim} \cdot 2\pi R_0 L/2\pi r L=(R_0/r)I_{rim} \quad (3)$$

where $I_{rim}$ is the intensity [W/m$^2$] of the sonic waves on the outermost circumferential surface of the optical fiber 1, $R_0$ is the outer diameter of the optical fiber 1, L is the length of the control signal 2, i.e. the piezoelectric element, in the axial direction of the optical fiber 1, which is equal to the length of each pixel in the lengthwise direction of the optical fiber 1.

Figure 7:
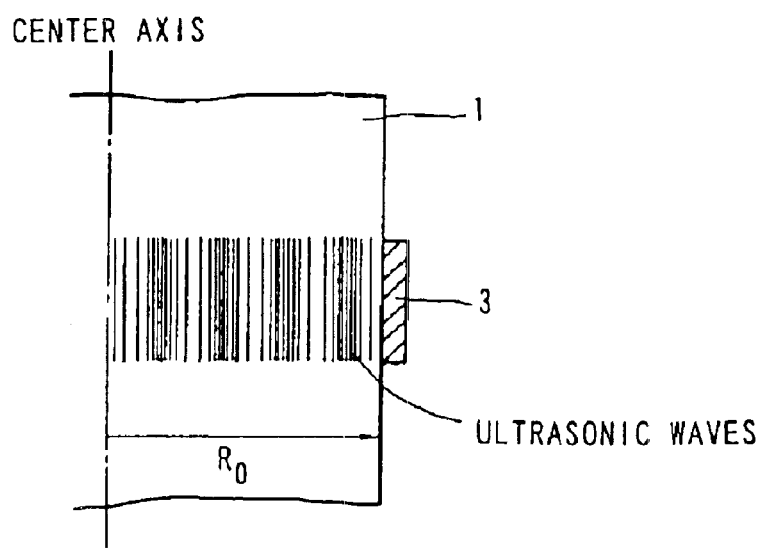
FIG. 7 is a cross-sectional view that shows an aspect of propagation of ultrasonic waves to an optical fiber in the flat color display having the tactual representation function according to the first embodiment of the invention.

FIG. 7 shows an aspect of propagation of ultrasonic waves in a lengthwise cross-sectional view (longitudinally sectional view) of the optical fiber 1. Since ultrasonic waves are longitudinal waves, compression waves normal to the center axis of the optical fiber are generated as shown in FIG. 7, and the sonic intensity I [W/m$^2$] relative to the sound pressure P [N/m$^2$] is given by:

$$I=P^2/\rho C_s \quad (4)$$

where $\rho$ is the liquid density, and $C_s$ is the sonic velocity. Assuming that the intensity I of the sonic waves generated by the piezoelectric element is an independent variable, then the sound pressure $P_{rim}$ on the outer circumferential surface of the optical fiber 1 is:

$$P_{rim}=(I\rho C_s)^{1/2} \quad (5)$$

Assuming that the optical fiber 1 is located under an ambient pressure $P_{amb}$ (that is normally the atmospheric pressure), the inequality (2) corresponds to the following inequality:

$$(P_{amb}-P(r))-P'<0 \quad (6)$$

Figure 8:
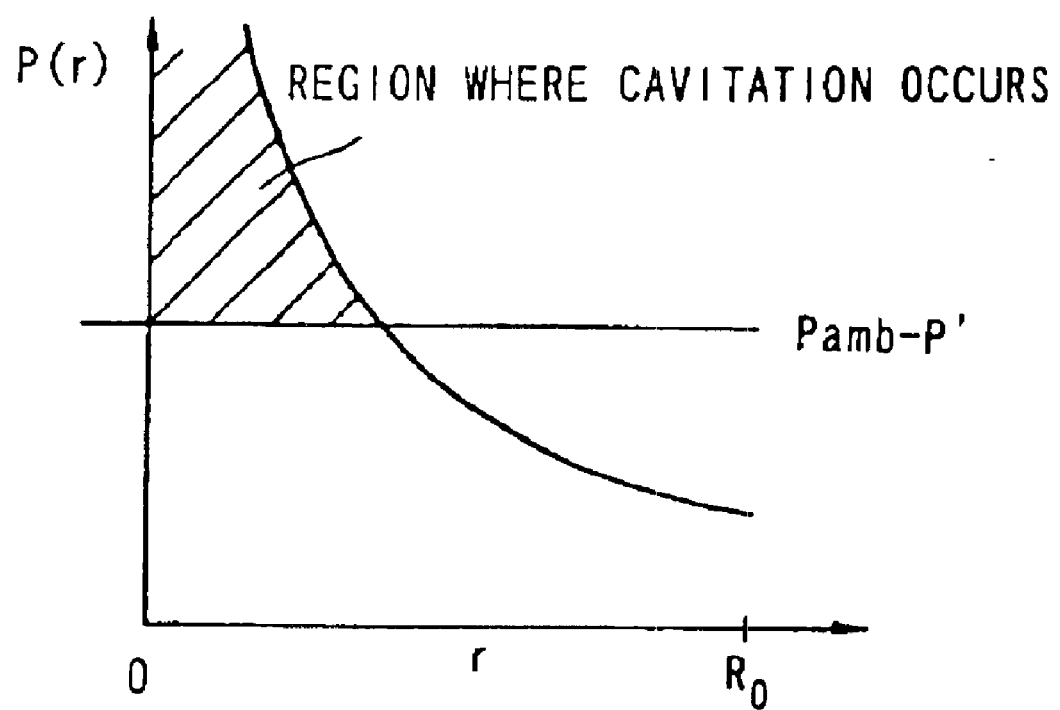
FIG. 8 is a schematic diagram for explaining conditions for generating cavitation in the core of an optical fiber in the flat color display having the tactual representation function according to the first embodiment of the invention.

The left side of the inequality (6) can be negative because, as shown in FIG. 8, P(r) exceeds $P_{amb}-P'$ when r is sufficiently small.

It will be appreciated from Inequality (6) that the use of a liquid exhibiting a high saturation vapor pressure under the atmospheric pressure is desirable for decreasing the power of ultrasonic waves to be generated by the piezoelectric element.

Here is shown an example of ultrasonic waves power to be generated by the piezoelectric element forming the control signal line 2. In case that cavitation occurs at the position of r=10 $\mu$m and generates bubbles, when $R_0$=100 $\mu$m, cavitation occurs at I(r)=0.3 W/cm$^2$, for example. Therefore, Equation (3) leads to $I_{rim}$=(r/$R_0$)I=(10/100)·0.3=0.03 W/cm$^2$.

Figure 9:
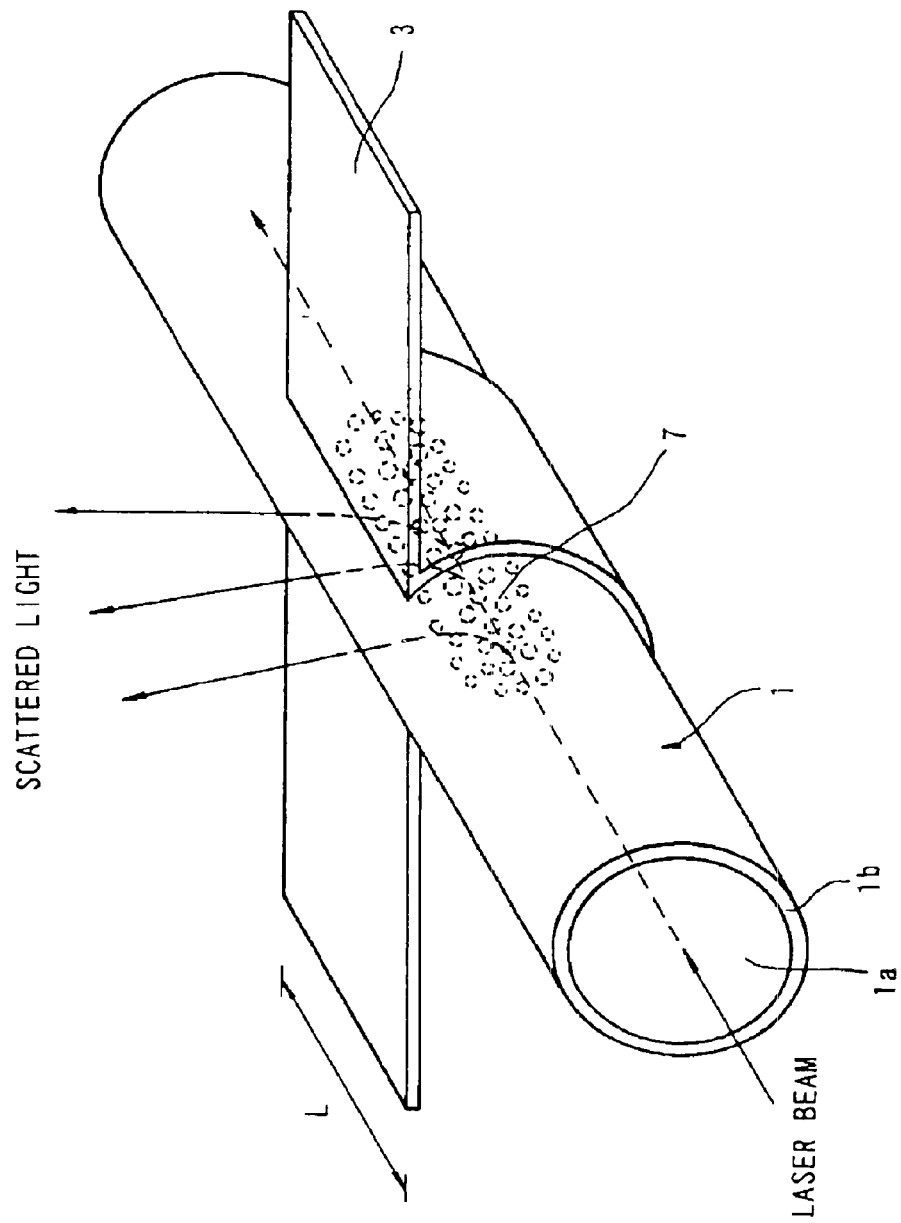
FIG. 9 is a schematic diagram that shows an aspect of light scattered by bubbles generated by cavitation in the core of an optical fiber in the flat color display having the tactual representation function according to the first embodiment of the invention.

FIG. 9 shows how incident light (laser beams) propagating through the optical fiber 1 is scattered by bubbles 7 produced by cavitation in the core 1a of a pixel scatter, and then led out outside the display side of the optical fiber 1. This aspect corresponds to the luminous state of this pixel.

When the power to the piezoelectric element is removed, it results in P(r)=0, and Inequality (6) is not satisfied, and light is guided inside the optical fiber 1 without being scattered. This aspect corresponds to the OFF state of the pixel.

When the diameter (2$R_0$) of the optical fiber 1 is 200 $\mu$m, the time required for switching light is the order of $R_0/C_s$~0.1 $\mu$sec, and sufficiently short, taking $C_s$~1 km/s into consideration. Since the time for controlling HDTV signals in line sequence is approximately ~10 $\mu$sec, in comparison with this, that switching speed is ten times higher, approximately.

Figure 10:
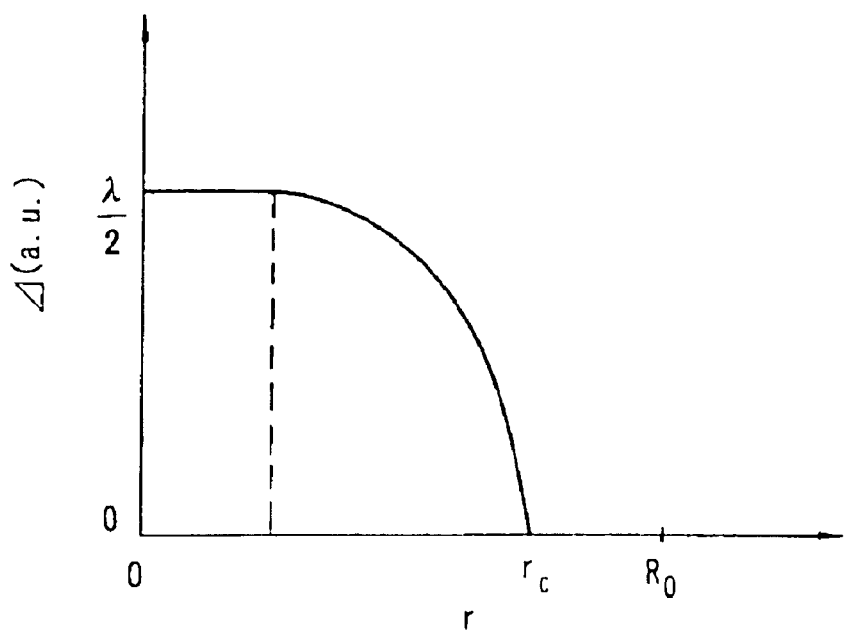
FIG. 10 is a schematic diagram that shows changes in space length required for generating bubbles in the core of an optical fiber by cavitation with distance in the radius vector direction of the optical fiber in the flat color display having the tactual representation function according to the first embodiment of the invention.

FIG. 10 shows a profile of space length A in the radius vector direction, with which Inequality (6) is satisfied. In Inequality (6), assume that its inequality sign changes to the equality sign when the value of r is $r_c$. Then, $$(P_{amb}-P(r_c))-P'=0 \quad (7)$$

In infinitely small bubbles 7 begin to generate at $r_c$. In a central portion of the optical fiber 1, i.e. at r~0, $\Delta$ becomes a half of the wavelength $\lambda$ of the ultrasonic waves. Size (diameter) of the bubble is proportional to $\Delta$.

Figure 11:
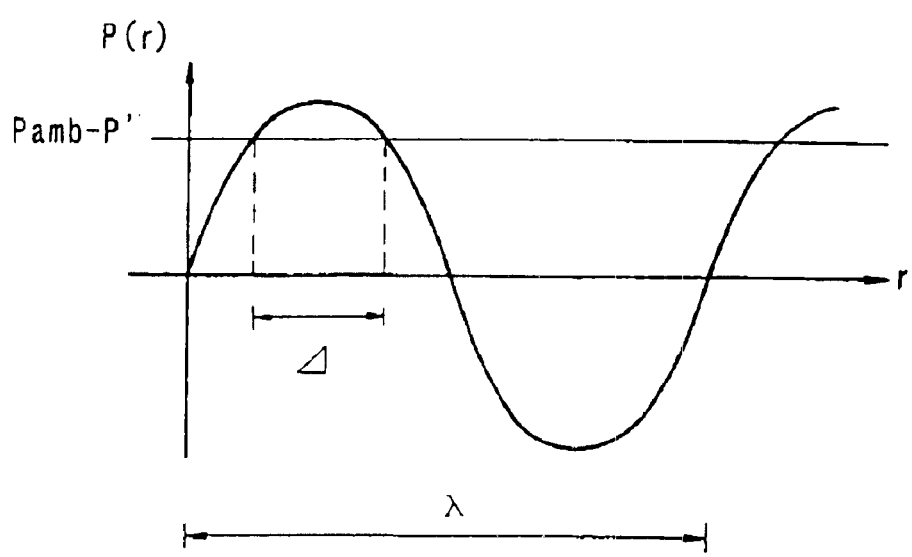
FIG. 11 is a schematic diagram that shows changes in space length required for generating bubbles in the core of an optical fiber by cavitation with distance in the radius vector direction of the optical fiber in the flat color display having the tactual representation function according to the first embodiment of the invention.

Instead of being random, the bubbles 7 can be distributed symmetrically about the center axis of the optical fiber 1 as shown in FIG. 11, for example, by appropriately designing the configuration of the contact surface of the control signal line 3 as the piezoelectric element with the optical fiber 1.

As apparent from Equations (3) through (6), $r_c$ can be controlled by adjusting the sonic intensity I of ultrasonic waves generated by the control signal line 3 as the piezoelectric element.

Number of bubbles $N_c$ generated in each pixel by cavitation can be expressed as follows when L=1 mm, $r_c$=100 $\mu$m.

$$N_c \sim L\pi r_c^2/\lambda^3 \sim 1 \text{ mm}\cdot\pi\cdot(100 \ \mu\text{m})^2/(20 \ \mu\text{m})^3 \sim 4\times10^3/\text{pixels}\cdot\text{columns}$$

That is, approximately 4000 bubbles 7 are typically generated for each of R, G and B in each pixel. Here is assumed that, when $\nu$ is the frequency of the ultrasonic waves, $\lambda = C_s/\nu \sim 1$ km/s/50 MHz$\sim 10^3/5\times10^7 = 2\times10^{-5}$ m=20 $\mu$m.

Figure 12:
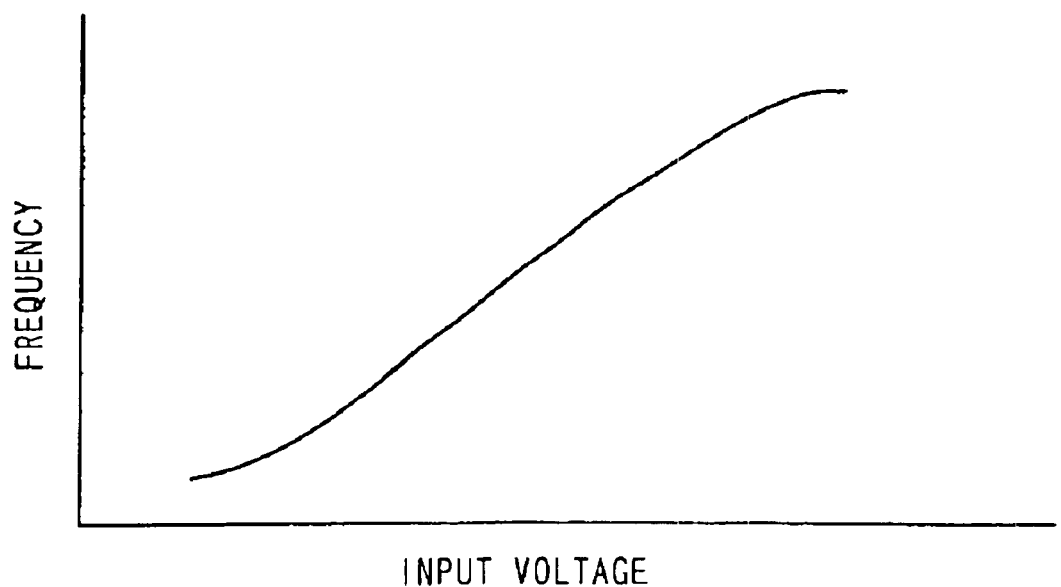
FIG. 12 is a schematic diagram that shows a dependency of the frequency of ultrasonic waves generated by a piezoelectric element forming a control signal upon input voltage in the flat color display having the tactual representation function according to the first embodiment of the invention.

Frequency $\nu$ of the ultrasonic waves, i.e. the wavelength $\lambda$, can be controlled by adjusting the input voltage to the piezoelectric element. An example of dependency of the frequency of ultrasonic waves upon the input voltage is shown in FIG. 12. For example, by using a voltage controlled crystal oscillator (VCXO) as the piezoelectric element, the output frequency can be controlled by the input voltage, and the wavelength $\lambda$ of the ultrasonic waves generated by the piezoelectric element can be controlled.

Gravitational movements of the bubbles generated by cavitation can be disregarded. For example, velocity of a bubble of a size around several mm in water is in the order of 1 cm/s, but that of a bubble with a size of $\mu$m is slower. Movable distance of a bubble 7 within $\mu$sec, which is the characteristic time scale for optical switching in the flat color display is not larger than the order of 10 nm. This is only one hundred thousands of the pixel size, and can be disregarded.

Figure 13:
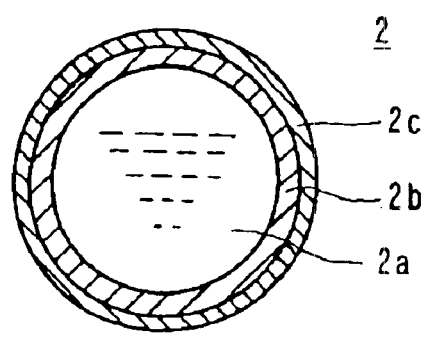
FIG. 13 is a cross-sectional view of a tactual representation fiber that forms the flat color display having the tactual representation function according to the first embodiment of the invention.

FIG. 13 shows a cross-sectional structure of the tactual representation fiber 2. As shown in FIG. 13, the fiber 2 is made up of a liquid core 2a and two solid cladding layers 2b and 2c around the core 2a. The liquid forming the core 1a is selected depending on the intended use. For example, water and ethyl alcohol with ultra fine oxide particles dispersed therein in accordance with the refractive index of the cladding 1a, for example, are suitable materials. Used as the material of the inner cladding 1b is a material permitting vapor to pass through when the liquid forming the core 2a is evaporated. For example, plastics of groups of polystyrene (PS), polyvinyl chloride (PVC) or polypropylene (PP) can be used. Used as the material of the outer cladding 2c is a material not permitting the liquid or particles of substances contained in the liquid to pass through. For example, plastics of the groups of polyacrylonitrile (PAN), ethylene vinyl acetate (EVA) and polyvinylidene chloride (PVDC) can be used. The fiber 2 can be made by preparing a thick plastic preform confining a liquid in a central portion and then expanding it, or by introducing a liquid into the cavity of a hollow optical fiber, for example.

Figure 14:
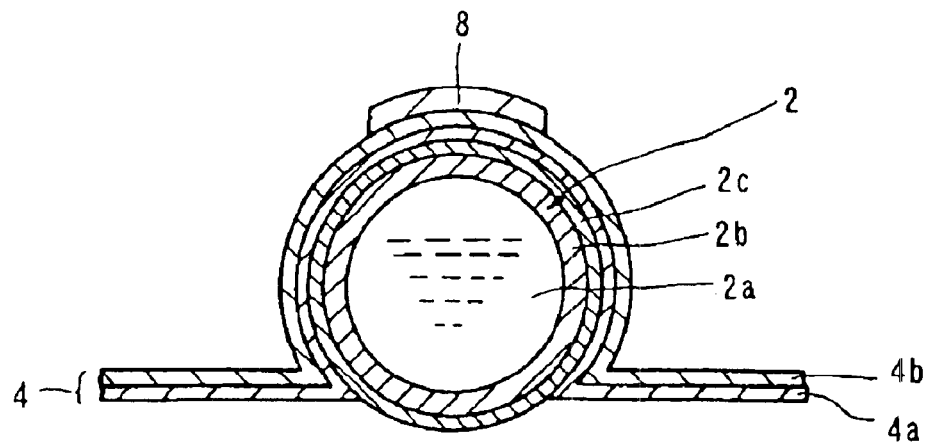
FIG. 14 is a cross-sectional view of an intersection point of a tactual representation fiber and a control signal line in the flat color display having the tactual representation function according to the first embodiment of the invention.

FIG. 14 is a cross-sectional view of an intersection point of an optical fiber 2 and a control signal line 4. As shown in FIG. 14, at each intersection of the control signal line with the fiber 2, the control signal line 4 defines a concave surface in contact with the outer circumferential surface of the fiber 2 excluding a part of the circumference facing the display plane of the display. The control signal line 4 has the structure stacking a metal electrode 4a and a piezoelectric material 4b, and the underlying metal electrode 4a is in contact with the outer circumferential surface of the fiber 2. On the other hand, a linear control signal line 8 extends on the outer circumferential surface of the fiber 2 in its lengthwise direction to run over the piezoelectric material 4b. The control signal line 8 is made of a metal electrode. Then, at each intersection point between the control signal line 8 and the control signal line 4, a piezoelectric element structure is formed, in which the piezoelectric material 4b is sandwiched between the metal electrode 4a of the control signal line 4 and the control signal line 8. The piezoelectric element used here is preferably configured to converge ultrasonic waves generated thereby near the boundary between the core 2a and the cladding 2b opposed to the control signal line 8. As a method of applying a voltage to the piezoelectric element, there is the method of grounding one of the metal electrode 4a of the control signal line 4 and the control signal line 8 forming a metal electrode and applying a positive voltage to the other, for example. Usable as the piezoelectric material 4b of the piezoelectric element are, for example, polycrystalline or ceramic materials like $PbTiO_3$, PZT, PLZT, ZnO, and polymers like polyvinylidene fluoride (PVDF). There are some methods usable for making the control signal line 4 in form of the piezoelectric element, such as the method usable when using a polycrystalline or ceramic material as the piezoelectric material 4b and configured to first arrange optical fibers 1 and fibers 2 in parallel and then sequentially stack a metal, piezoelectric material and metal through an appropriate mask by sputtering, vacuum evaporation, screen printing, or the like, and the method usable when using PVDF as the piezoelectric material 4b and configured to first prepare a multi-layered film stacking metal films on opposite surfaces of a PVDF film and then bond stripe-shaped cutout pieces thereof onto outer circumferential surfaces of the optical fibers 1 and the fibers 2. The control signal line 8 can be made by stacking layers of a metal layer, a piezoelectric material and a metal through an appropriate mask by sputtering, vacuum evaporation, screen printing, or the like.

Diameter of each fiber 2 is 200 through 300 $\mu$m, for example, and width of the control signal line 4, i.e. the width of the piezoelectric element (corresponding to the length of each pixel in the lengthwise direction of the fiber 2), is about 1 mm, for example.

Figure 15:
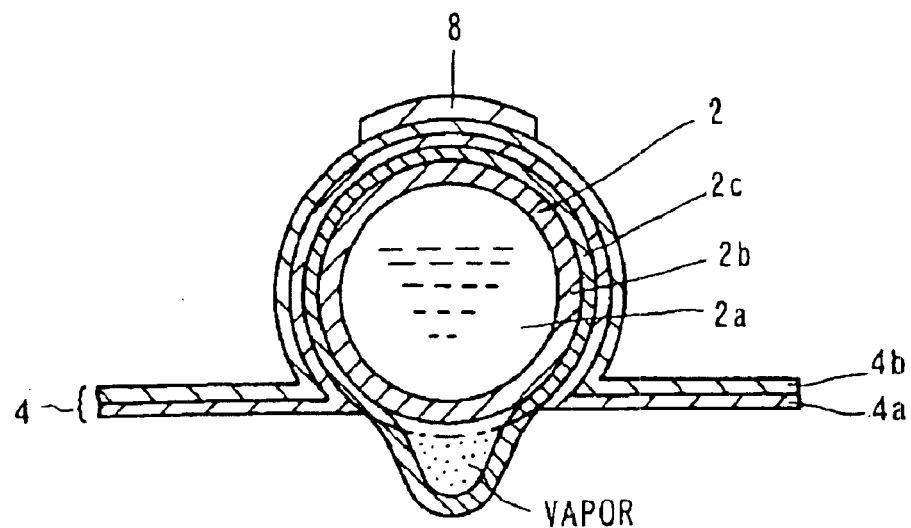
FIG. 15 is a cross-sectional view of an intersection point of a tactual representation fiber and a control signal line in the flat color display having the tactual representation function according to the first embodiment of the invention.

When ultrasonic waves are generated by driving the piezoelectric element at the intersection point between the control signal line 8 and the control signal line 4, the ultrasonic waves causes cavitation in the liquid core 2a of the fiber 2 because of the principle already explained before, and bubbles are produced. In other words, ultrasonic waves generated by the piezoelectric element function to evaporate the liquid forming the core 2a. The vapor passes through the inner cladding 2b and enters into the gap between the inner cladding 2b and the outer cladding 2c. As a result, as shown in FIG. 15, the cladding 2c partly bulges out. That is, a projection is formed in the cladding 2c. When driving of the piezoelectric element is stopped, the cladding 2c returns to the original form.

Based on this mechanism, next explained is a method of operating the flat color display having the tactual representation function according to the first embodiment. In response to an image signal, specified R, G, B optical fibers 1 and a control signal line 3 are selected. By driving the semiconductor laser 5 at the ends of the selected optical fibers 1, laser beams from the semiconductor laser 5 are introduced into the cores 1a of the optical fibers 1, and a predetermined voltage is applied from the selected control signal line 3 across the pair of metal electrodes 3a, 3b of the control signal line 3 to drive the piezoelectric element, thereby causing cavitation and generating bubbles 7 in the cores 1a. Then, red, green and blue laser beams introduced into respective optical fibers 1 are scattered by these bubbles 7, scattered beams of light are led out ahead the display plane. As a result, a desired color image is displayed.

Figure 16:
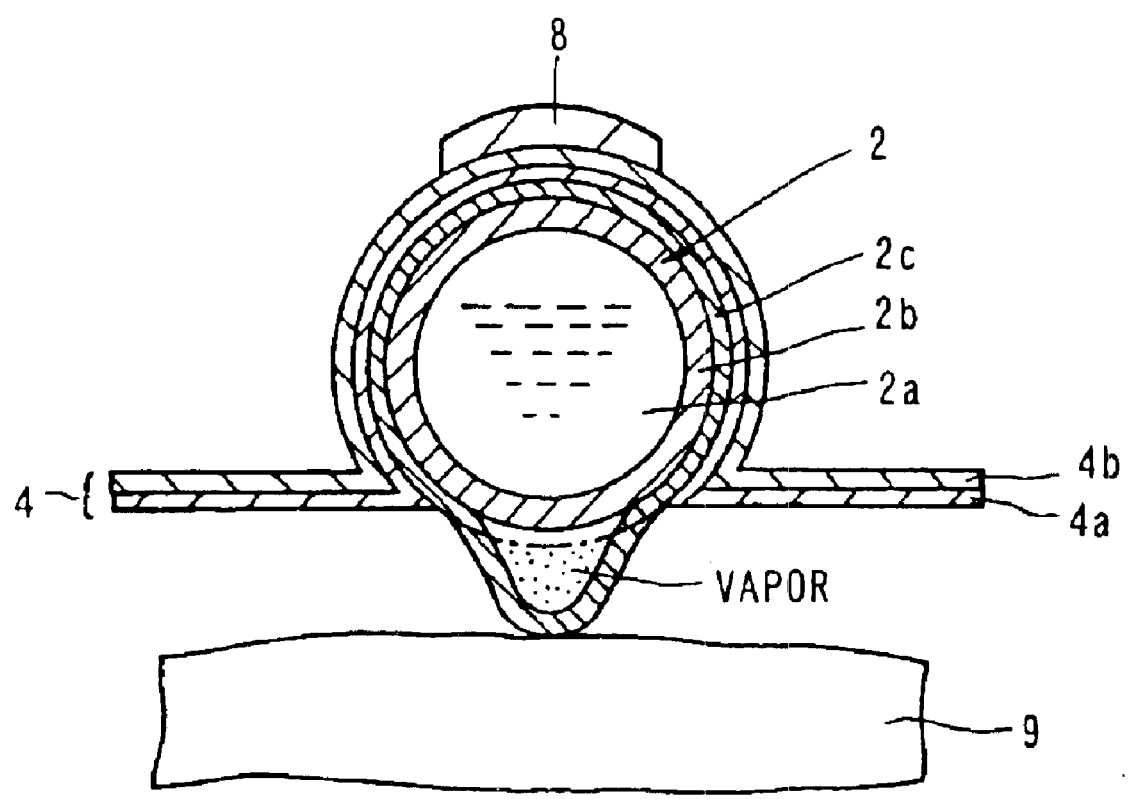
FIG. 16 is a cross-sectional view of an intersection point of a tactual representation fiber and a control signal line in the flat color display having the tactual representation function according to the first embodiment of the invention.

On the other hand, signals by each horizontal scan of the control signal line 3 is input as laser light each CCD line sensor 6, and the input pieces of information are sequentially accumulated in the shift register to sequentially store one-frame information. Then, by signal processing for taking a differential time of recording for each frame, movement information and/or periodical motion information of each display image can be obtained. For example, in case of an image of an insect swinging its wings, vibration information of the wings can be obtained. The vibration frequency, thus obtained, is fed back to the piezoelectric element at the intersection point between the control signal line 4 and the control signal line 8. Responsively, a positive voltage is applied to the control signal line selected in accordance with the image to be displayed, and the piezoelectric element at the intersection point between the control signal line 4 and the selected control signal line 8 is driven to generate ultrasonic waves. On the other hand, unselected control signal lines 8 are not supplied with the positive voltage, and they are maintained at the ground potential, for example. As a result, a projection is formed in each selected signal line 8 to bulge ahead the display plane of the fiber 2. Thus, as shown in FIG. 16, if a user touches the screen with a finger 9, he can perceive vibration of wings of the insect displayed on the screen as vibration of the projection. Additionally, audio information can be loaded on high-frequency oscillation of the piezoelectric element in the order of 10 MHz, as an envelope function of the fiber 2, i.e., low-frequency cooperation phenomenon. More specifically, sound of the vibration of wings of the insect can be reproduced in form of low-frequency vibration of the projection formed on the surface of the fiber 2.

Figure 17:
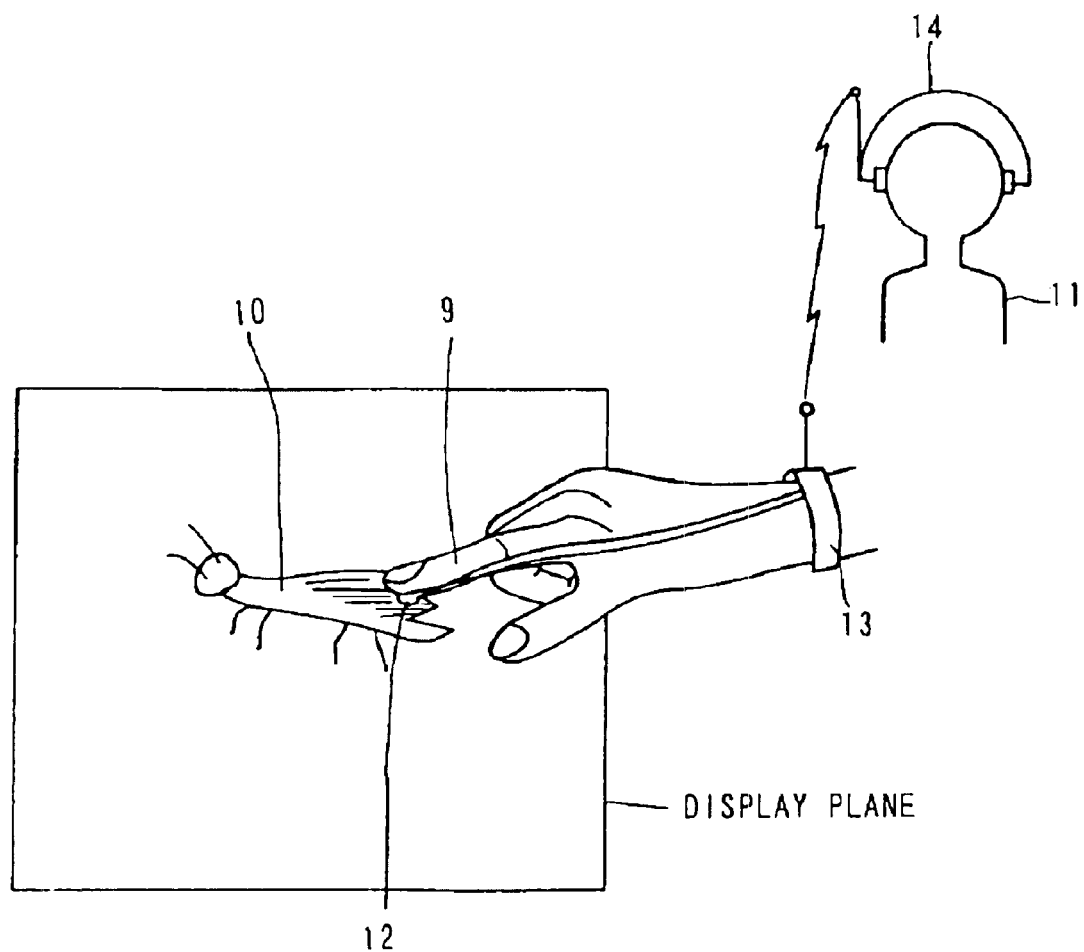
FIG. 17 is a schematic diagram for explaining behaviors of the flat color display having the tactual representation function according to the first embodiment of the invention.

In the manner explained above, a user can obtain tactile texture and local vibration sound by touching the screen. More specifically, as shown in FIG. 17, for example, together with the image of the insect 10 swinging its wings, vibration of the wings of the insect 10 can be recognized through the tip of the finger 9, and vibration sound of the wings of the insect 10 can be reproduced locally at the position of the wings.

Regarding sound exerted from the screen, users may listen to it by directly bringing their ears closely to the screen. However, it is more preferable to provide an ultra microphone 12 worn on the tip of a finger 9 of the audience 11 such that the ultra microphone amplifies the sound exerted from the screen, send it to a wrist band processor 13 worn on a wrist of the audience 11, and then send it to a cordless head phone 14 worn on the head of the audience 11. In this manner, the audience 11 will be able to get a better-reproduced sound. Background general sound (such as thunder) may be output from ordinary speakers.

Figure 18A:
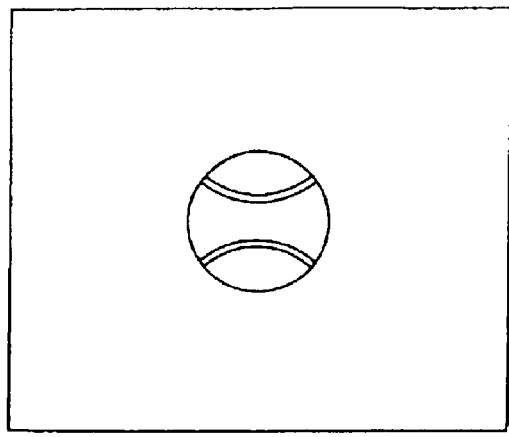
FIG. 18 is a schematic diagram for explaining behaviors of the flat color display having the tactual representation function according to the first embodiment of the invention.
Figure 18B:
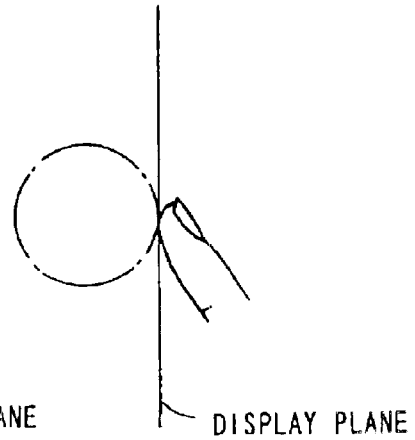

In the flat color display having the tactual representation function, it is also possible to transmit and display information about rough surface texture. That is, as shown in FIG. 18A, for example, in case a tennis ball is displayed on the screen, the surface roughness on the surface of the tennis ball due to fine hair thereon can be reproduced. Then, as shown in FIG. 18B, the user can feel the surface roughness of the tennis ball by directly touching the screen with his finger. In this case, by taking spatial difference of recording for each frame, the surface where the difference is 0 is a smooth plane, and the projection given by amplifying the amplitude of the high-frequency vibration is zero.

Further, with the flat color display having the tactual representation function, it is also possible to transmit information concerning relative surface temperature. That is, when supersonic waves are generated as a result of driving the piezoelectric element at the intersection point between the tactual representation fiber 2 and the tactual representation control signal line 4, the liquid forming the core 2a of the fiber 2 at that portion rise in temperature. By using this mechanism, information on surface temperature of the subject of transmission can be displayed on the display plane as information of relative surface temperature.

Furthermore, with the flat color display having the tactual representation function, it is also possible to transmit information concerning changes in temperature. That is, by executing signal processing for obtaining color difference of recording for each frame, information about changes in temperature of an image to be displayed can be obtained.

As explained above, according to the first embodiment, since the flat color display is composed of optical fibers having the liquid cores 1a, fibers having the liquid cores 2a, and control signal lines 3 and 4 which are arranged in vertical and horizontal directions, it is possible to obtain a flexible, thin, light and inexpensive flat color display having a tactual representation function. Additionally, with the flat color display, it is possible to enjoy local sound on the screen. Further, the screen can be readily enlarged by increasing the length and number of optical fibers 1 and the fibers 2 to obtain a large-scale screen of the 100-inch class, for example. Furthermore, a high-fidelity color display can be obtained by sufficiently decreasing intervals of optical fibers 1 and decreasing intervals of the control signal lines 3. Moreover, since it takes only a very short time interval for bubbles to generate and disappear in the core 1a, high-speed operation can be expected. Additionally, the display can be curved very easily in the horizontal direction, which is the alignment direction of human eyes, and can represent a large-scaled three-dimensional image without distortion.

Next explained is a flat color display having a tactual representation function according to the second embodiment of the invention.

Figure 19:
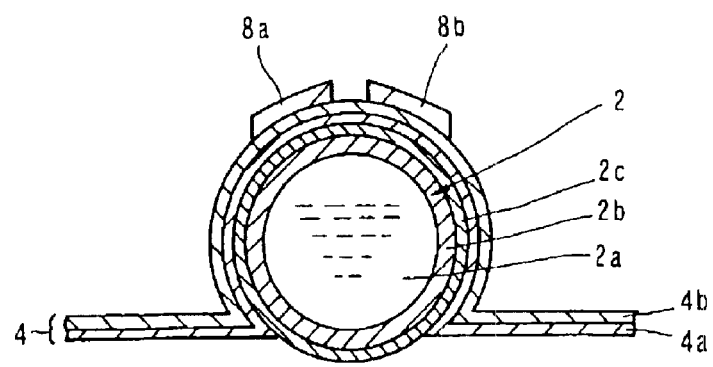
FIG. 19 is a cross-sectional view of a tactual representation fiber that forms a flat color display having a tactual representation function according to the second embodiment of the invention.

In the flat color display having a tactual representation function shown here, each control signal line 8 provided on the outer circumferential surface of the tactual representation fiber 2 in the flat color display having the tactual representation function according to the first embodiment is divided into two in its width direction. That is, as shown in FIG. 19, control signal lines 8a, 8b are separately provided on the outer circumferential surface of each tactual representation fiber 2 to extend along its lengthwise direction. These control signal lines 8a, 8b can be driven independently from each other. In the other respects, the structure shown here is the same as that of the first embodiment, and explanation there of is omitted here.

Figure 20:
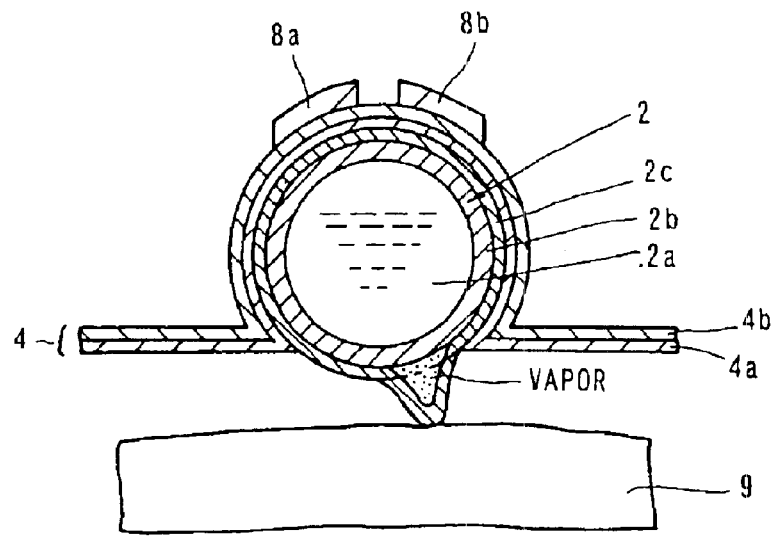
FIG. 20 is a cross-sectional view for explaining behaviors of the flat color display having a tactual representation function according to the second embodiment of the invention.
Figure 21:
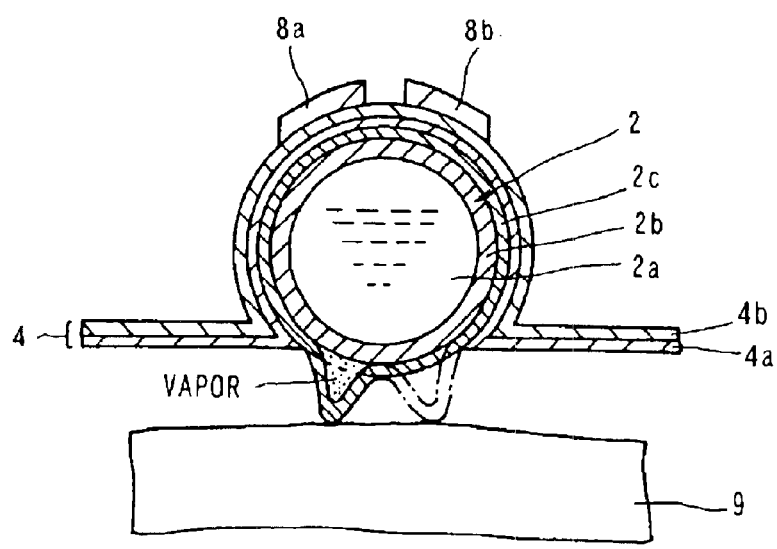
FIG. 21 is a cross-sectional view for explaining behaviors of the flat color display having a tactual representation function according to the second embodiment of the invention.
Figure 22:
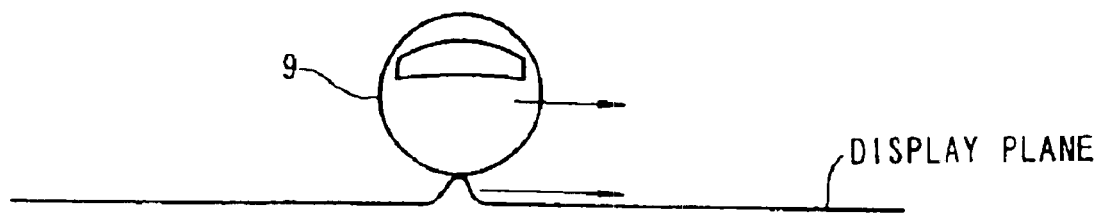
FIG. 22 is a cross-sectional view for explaining behaviors of the flat color display having a tactual representation function according to the second embodiment of the invention.
Figure 23:
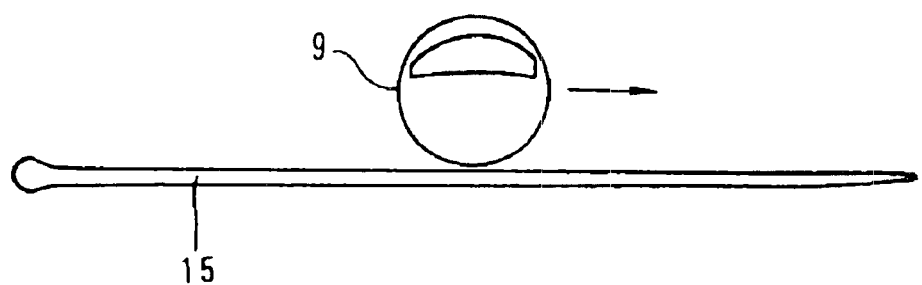
FIG. 23 is a cross-sectional view for explaining behaviors of the flat color display having a tactual representation function according to the second embodiment of the invention.

A method of operating the flat color display having the tactual representation function according to the second embodiment will be explained below. The same method as that of the first embodiment is used here again for displaying color images. Representation of tactile information is done as follows. That is, a signal obtained by each horizontal scan of the control signal line 3 is input as laser beams into individual CCD line sensors 6, and the input pieces of information are sequentially accumulated in the shift register to sequentially store one-frame information. Then, by signal processing for taking a differential time of recording for each frame, movement information and/or periodical motion information of each display image can be obtained. For example, in case of an image of an insect swinging its wings, vibration information of the wings can be obtained. The vibration frequency, thus obtained, is fed back to the piezoelectric element at the intersection point between the control signal line 4 and the control signal lines 8a and 8b. Responsively, a positive voltage is applied to the control signal line selected in accordance with the image to be displayed, and the piezoelectric element at the intersection point between the control signal line 4 and the selected control signal lines 8a, 8b is driven to generate ultrasonic waves such that, as shown in FIGS. 20 and 21, projections are formed alternately on surface portions of the cladding 2c of the fiber 2 opposed to the control signal lines 8a, 8b via the core 2a. It is important here that distance D between these projections is within the minimum distinguishable distance for the tip of the finger 9. Regarding the time interval of alternate formation of these projections, it is important that it is within the minimum distinguishable time interval for the tip of the finger 9. Since the oscillation frequency of the piezoelectric element is tens of 10 MHz, this is within the minimum distinguishable time interval for the tip of the finger 9. As shown in FIGS. 20 and 21, when a user touch the screen with his finger 9, he can feel that a certain pressure is applied to the tip of the finger 9 when projections are formed on surface portions of the cladding 2c of the fiber 2 opposed to the control signal lines 8a, 8b, as already explained. Additionally, as shown in FIG. 22, while a user touch the projections appearing on the screen, by moving the projection is moved in the arrow-marked direction in equal velocity and simultaneously moving the tip of the finger 9 in the same direction at the same velocity as that of the projection, the user can get feeling of touching a piece of hair 15 as shown in FIG. 23 with the tip of the finger 9. If a difference is made between the speed of the tip of the finger 9 and the speed of the projection, then a tactile representation of a moving-around insect, for example, can be realized as well.

The second embodiment ensures the same advantages as those of the first embodiment.

Next explained is a flat color display having a tactual and olfactory representation function according to the third embodiment of the invention.

Figure 24:
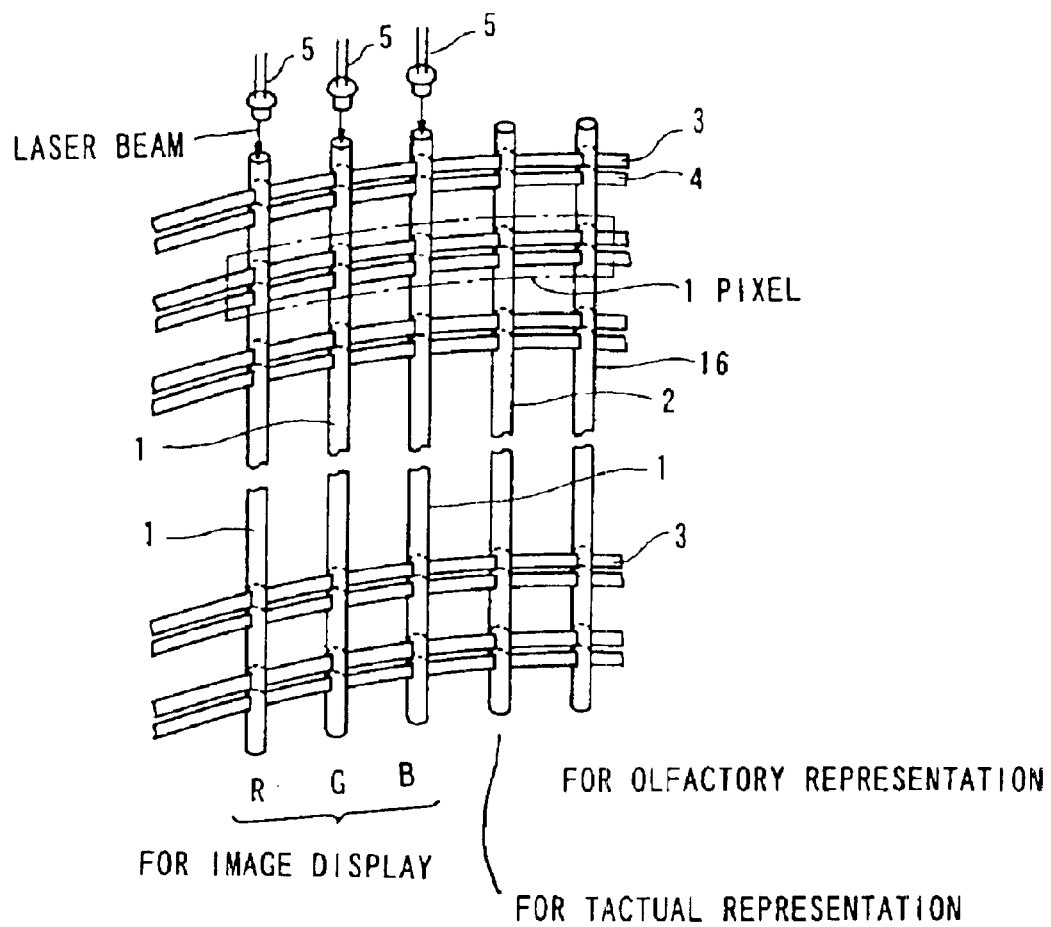
FIG. 24 is a schematic diagram that shows a part of a flat color display having a tactual/olfactory representation function according to the third embodiment of the invention.

As shown in FIG. 24, the flat color display having the tactual and olfactory representation function is made by adding N olfactory representation fibers 16 each associated with three optical fibers 1 forming one pixel in the lengthwise direction of the control signal lines 3 and 4 to the flat color display having the tactual representation function according to the first embodiment.

Figure 25:
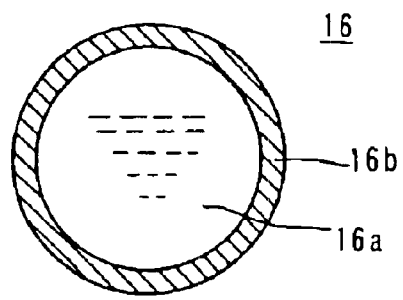
FIG. 25 is a cross-sectional view of an olfactory representation fiber that forms the flat color display having the tactual/olfactory representation function according to the third embodiment of the invention.

FIG. 25 shows a cross-sectional structure of each olfactory representation fiber 16. As shown in FIG. 25, the fiber 16 is made up of a liquid core 16a and a solid cladding 16b around the core 16a. As the liquid forming the core 16a, a material functioning as the origin of a smell is selected, depending upon the intended use. For example, a perfume is used. Used as the material of the cladding 16b is a material permitting vapor to pass through when the liquid forming the core 16a is evaporated. For example, plastics of groups of polystyrene (PS), polyvinyl chloride (PVC) or polypropylene (PP) can be used. The fiber 16 can be made by preparing a thick plastic preform confining a liquid in a central portion and then expanding it, or by introducing a liquid into the cavity of a hollow optical fiber, for example.

Figure 26:
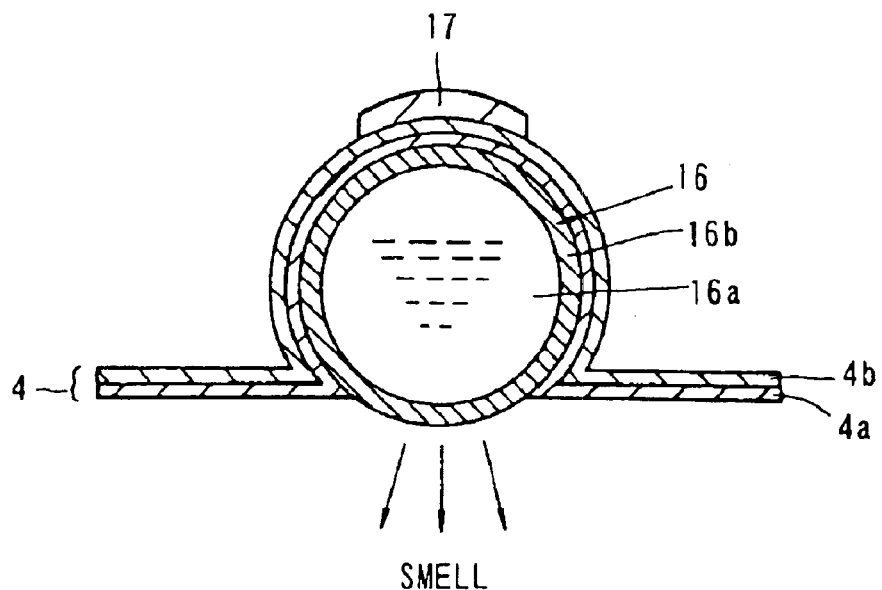
FIG. 26 is a cross-sectional view of an intersection point of an olfactory representation fiber and a control signal line in the flat color display having the tactual/olfactory representation function according to the third embodiment of the invention.

FIG. 26 is a cross-sectional view of an intersection point of an optical fiber 16 and a control signal line 4. As shown in FIG. 26, at each intersection point of the control signal line with the fiber 16, the control signal line 4 defines a concave surface in contact with the outer circumferential surface of the fiber 16 excluding a part of the circumference facing the display plane of the display. The control signal line 4 has the structure stacking a metal electrode 4a and a piezoelectric material 4b, and the underlying metal electrode 4a is in contact with the outer circumferential surface of the fiber 16. On the other hand, a linear control signal line 17 extends on the outer circumferential surface of the fiber 16 in its lengthwise direction to run over the piezoelectric material 4b. The control signal line 17 is made of a metal electrode. Then, at each intersection point between the control signal line 17 and the control signal line 4, a piezoelectric element structure is formed, in which the piezoelectric material 4b is sandwiched between the metal electrode 4a of the control signal line 4 and the control signal line 17. The piezoelectric element used here is preferably configured to converge ultrasonic waves generated thereby near the boundary between the core 16a and the cladding 16b opposed to the control signal line 17. As a method of applying a voltage to the piezoelectric element, there is the method of grounding one of the metal electrode 4a of the control signal line 4 and the control signal line 17 forming a metal electrode and applying a positive voltage to the other, for example. Usable as the piezoelectric material 4b of the piezoelectric element are, for example, polycrystalline or ceramic materials like $PbTiO_3$, PZT, PLZT, ZnO, and polymers like polyvinylidene fluoride (PVDF). There are some methods usable for making the control signal line 4 in form of the piezoelectric element, such as the method usable when using a polycrystalline or ceramic material as the piezoelectric material 4b and configured to first arrange optical fibers 1 in parallel and then sequentially stack a metal, piezoelectric material and metal through an appropriate mask by sputtering, vacuum evaporation, screen printing, or the like, and the method usable when using PVDF as the piezoelectric material 4b and configured to first prepare a multi-layered film stacking metal films on opposite surfaces of a PVDF film and then bond stripe-shaped cutout pieces thereof onto outer circumferential surfaces of the optical fibers 1. The control signal line 17 can be made by stacking layers of a metal layer, a piezoelectric material and a metal through an appropriate mask by sputtering, vacuum evaporation, screen printing, or the like.

Diameter of each fiber 16 is 200 through 300 μm, for example, and width of the control signal line 3, i.e. the width of the piezoelectric element (corresponding to the length of each pixel in the lengthwise direction of the fiber 17), is about 1 mm, for example.

When ultrasonic waves are generated by driving the piezoelectric element at the intersection point between the control signal line 17 and the control signal line 4, the ultrasonic waves causes cavitation in the liquid core 16a of the fiber 16 because of the principle already explained before, and bubbles are produced. In other words, ultrasonic waves generated by the piezoelectric element function to evaporate the liquid forming the core 2a or a substance contained in the liquid. The vapor is released externally through the cladding 16b. As a result, a user can enjoy the smell of the perfume, for example.

Next explained is a flat color display having a tactual representation function according to the fourth embodiment of the invention.

The flat color display having the tactual and olfactory representation function is made by adding N humidity control fibers 16 each associated with three optical fibers 1 forming one pixel in the lengthwise direction of the control signal lines 3 and 4 to the flat color display having the tactual representation function according to the first embodiment. Although this fiber has a structure similar to that of the fiber 16 in the third embodiment, the liquid forming the core 16a is water.

In the fourth embodiment, similarly to the third embodiment, when ultrasonic waves are generated by driving the piezoelectric element at the intersection point between the control signal line 17 and the control signal line 4, the ultrasonic waves causes cavitation in the liquid core 16a of the fiber 16 because of the principle already explained before, and bubbles are produced. In other words, ultrasonic waves generated by the piezoelectric element function to evaporate the liquid, i.e. water, forming the core 2a or a substance contained in the liquid. The vapor is released externally through the cladding 16b. By using this mechanism, information about surface humidity of a subject of transmission can be transmitted and demonstrated on a display plane as information on relative surface temperature.

Next explained is a flat color display having a tactual representation function according to the fifth embodiment of the invention.

Figure 27:
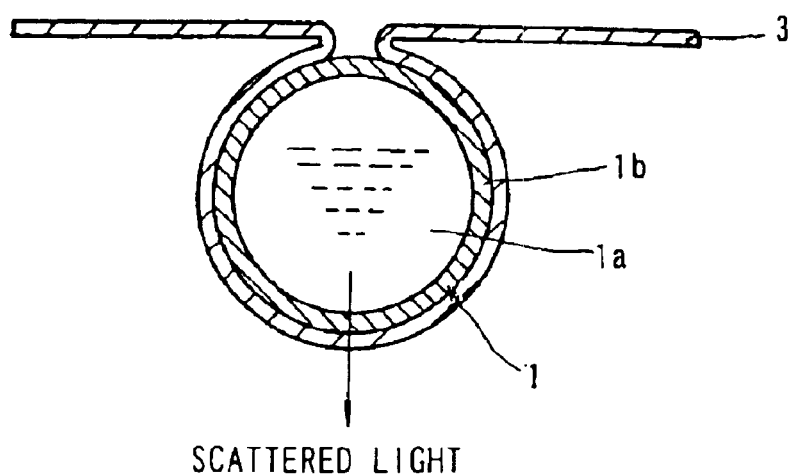
FIG. 27 is a cross-sectional view of an intersection point of an optical fiber and a control signal line in the flat color display having the tactual representation function according to the fifth embodiment of the invention.

The flat color display having a tactual representation function is different from the first embodiment in structure of the intersection of each optical fiber 1 and the control signal line 3. More specifically, in the fifth embodiment, as shown in FIG. 27, at each intersection point of the control signal line with the optical fiber 1, the control signal line 3 made of a piezoelectric element defines a concave plane in contact with the outer circumferential surface of the optical fiber 1 excluding a part of the circumference facing the display plane of the display. In this case, the control signal line 3 as the piezoelectric element is made of a transparent material such that light scattered in the core 1a can be efficiently led out externally through the control signal line 3. As the transparent piezoelectric material 3c of the piezoelectric element, a transparent polymer, such as PVDF, for example, may be used, and ITO, for example, can be used as the transparent electrode.

In the other respects, the fifth embodiment is the same as the first embodiment, and explanation thereof is omitted here.

The fifth embodiment ensures the same advantages as those of the first embodiment.

Next explained is a flat color display having a tactual representation function according to the sixth embodiment of the invention.

Figure 28:
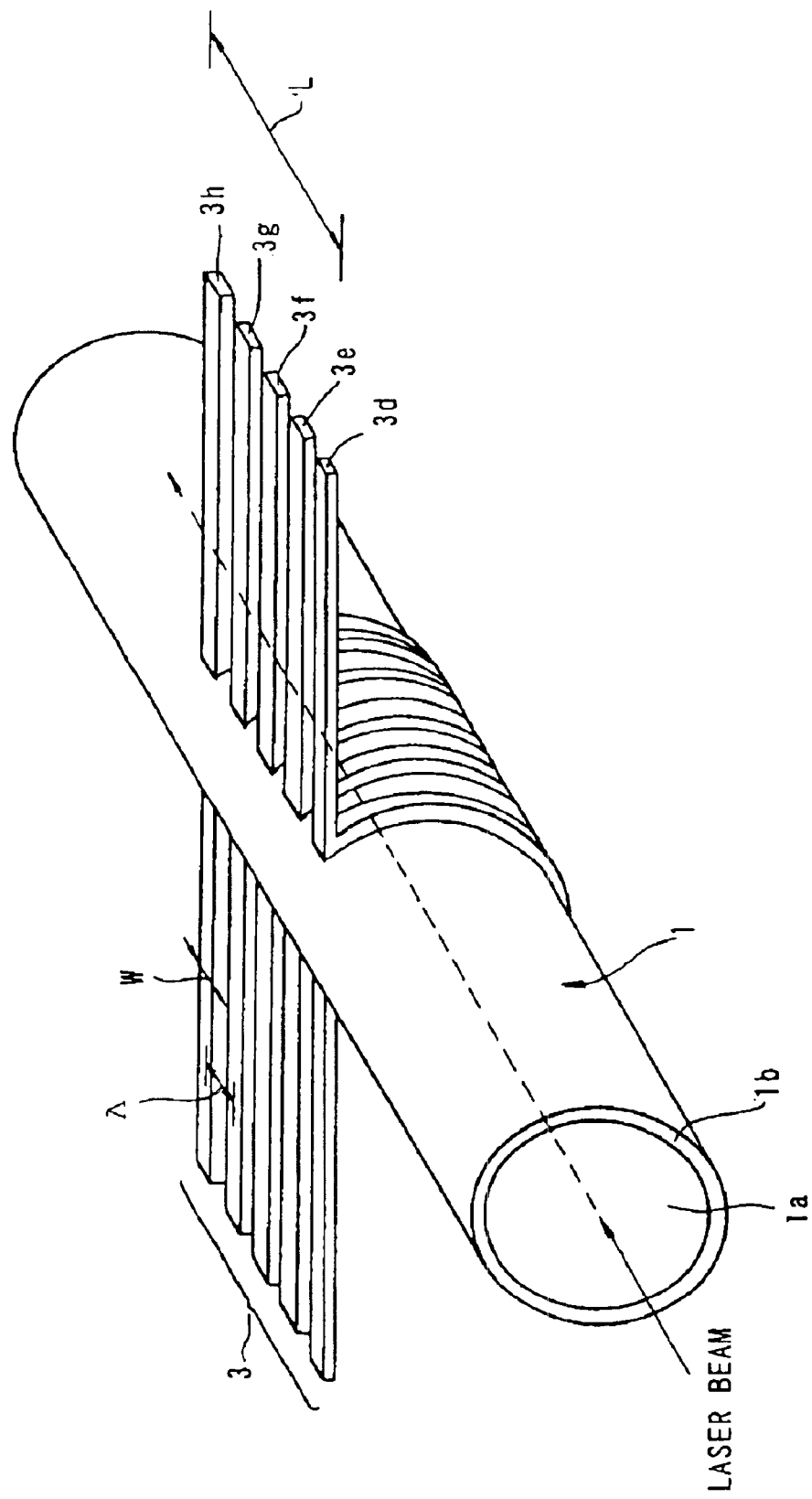
FIG. 28 is a perspective view of an intersection point of an optical fiber and a control signal line in the flat color display having the tactual representation function according to the fifth embodiment of the invention.

As shown in FIG. 28, in the flat color display having the tactual representation function, the control signal line made up of a piezoelectric element is divided into stripes 3d, 3e, 3f, 3g and 3h each having the width W and aligned at intervals Λ in their width direction. Stripes 3d, 3f and 3h of the piezoelectric element are supplied with a voltage opposite in phase from a voltage applied to the stripes 3e and 3g.

In the other respects, the sixth embodiment is the same as the first embodiment, and explanation thereof is omitted here.

The sixth embodiment ensures the same advantages as those of the first embodiment. Additionally, the following advantage can be obtained as well.

Figure 29:
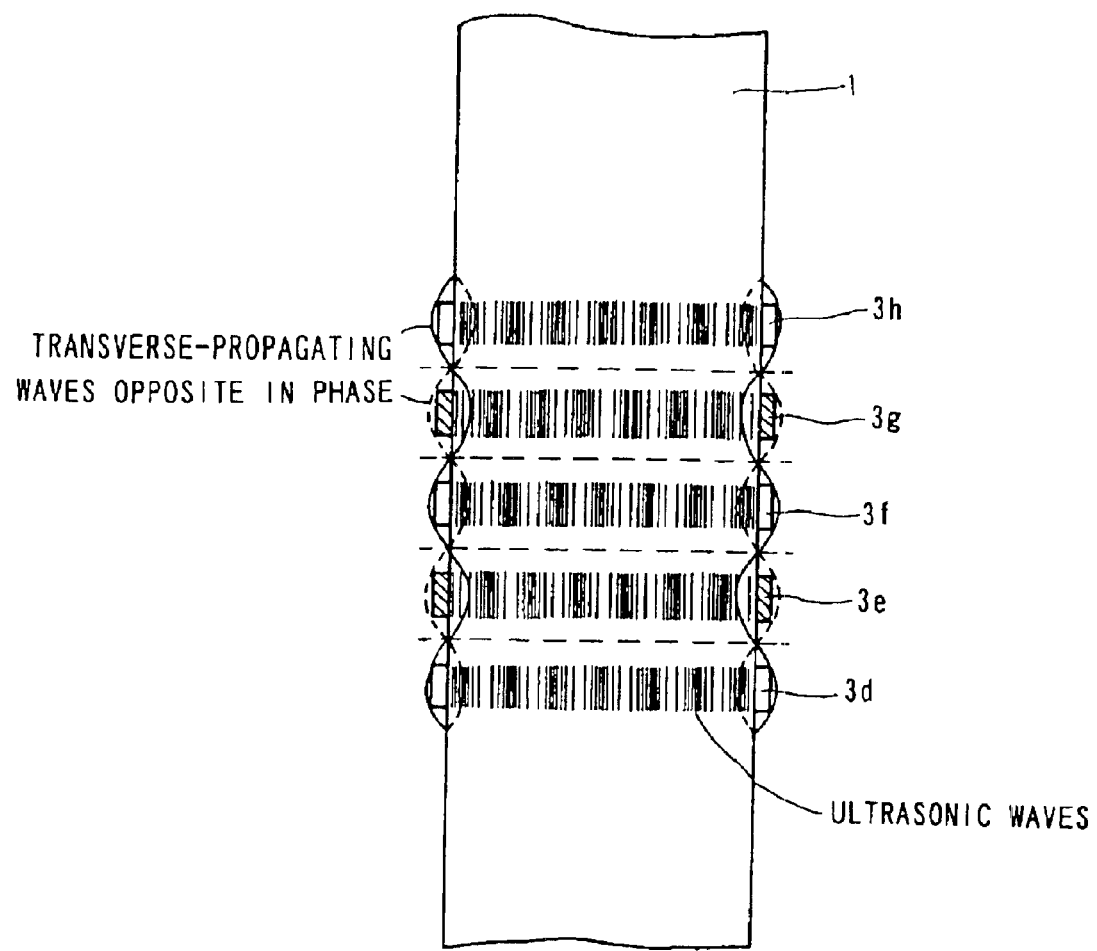
FIG. 29 is a cross-sectional view that shows an aspect of propagation of ultrasonic waves to an optical fiber in the flat color display having the tactual representation function according to the sixth embodiment of the invention.

FIG. 29 shows an aspect of propagation of ultrasonic waves upon driving the piezoelectric element by applying voltages opposite in phase to the group of the stripes 3d, 3f, 3h of the piezoelectric element and the group of the stripes 3e, 3g of the piezoelectric element and thereby generating ultrasonic waves. At that time, since every adjacent stripes of the piezoelectric element among the stripes 3d, 3d, 3f, 3g and 3h are driven by voltages opposite in phase, propagation of ultrasonic waves in the lengthwise direction of the optical fiber 1 can be prevented. Therefore, ultrasonic waves can be locally limited to the portions of the stripes 3d, 3e, 3f, 3g and 3h, and cavitation by ultrasonic waves can be limited inside each single pixel. In other words, cross talk between pixels adjacent in the lengthwise direction of the optical fiber 1 can be prevented. Additionally, since the stripes 3d, 3e, 3f, 3g and 3h periodically aligned at intervals Λ in the lengthwise direction of the optical fiber 1 function as diffraction gratings, scattering of light in the lengthwise direction by bubbles generated in the core 1a of the optical fiber 1 can be enhanced, and light can be efficiently led out externally.

Next explained is a flat color display having a tactual representation function according to the seventh embodiment of the invention.

Figure 30:
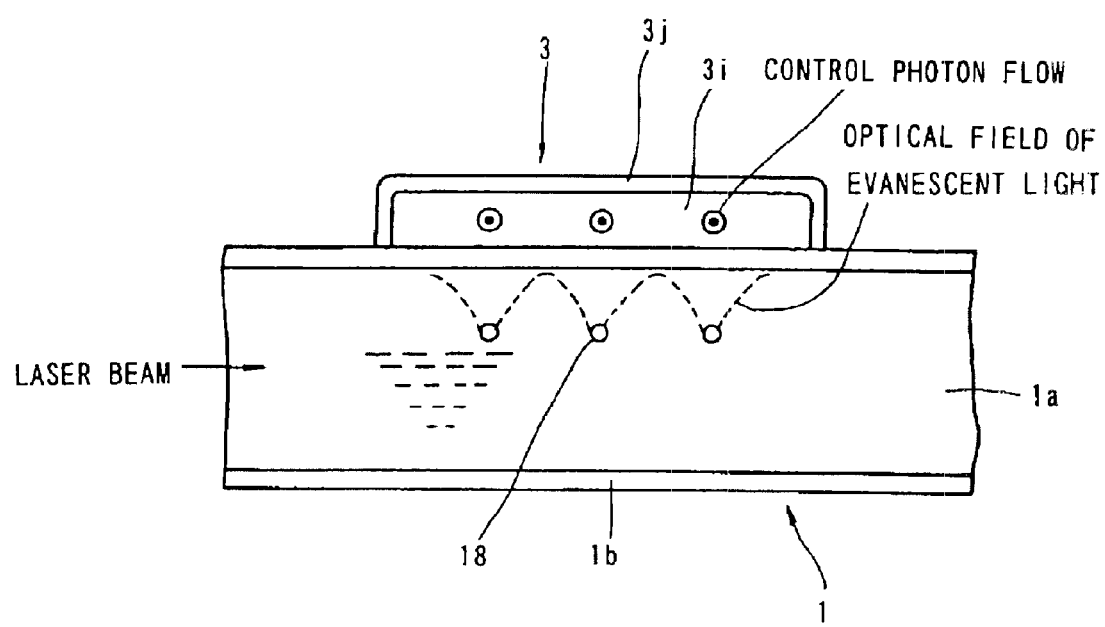
FIG. 30 is a perspective view of an intersection point of an optical fiber and a control signal line in the flat color display having the tactual representation function according to the seventh embodiment of the invention.

As shown in FIG. 30, in the flat color display having the tactual representation function, the core 1a of each optical fiber 1 is made of a liquid containing fine particles 18 dispersed therein as light scattering elements (a kind of sol). Each signal line 3 is an optical control element made up of an optical waveguide 3i and a cladding 3j covering it, and it intersects with each optical fiber 1 and contact with a part of its outer circumferential surface.

In the flat color display having the tactual representation function, a control photon flow is generated in the optical waveguide 3i of each control signal line 3 as shown in FIG. 30. As a result, evanescent light is generated in a part of the optical fiber 1 in contact with the optical waveguide 3i, and the evanescent light functions to move the fine particles dispersed in the liquid forming the core 1a of the optical fiber 1 to positions corresponding to the positions of photons traveling through the optical waveguide 3i. Especially when the fine particles 18 are those of a polar organic compound having a dipole moment, for example, it is also possible to change orientation of the fine particles 18 under a function of the electric field of the evanescent light. Using these mechanisms, it is possible to efficiently scatter the laser beams introduced into the optical fiber 1 and efficiently lead out the light externally.

In the other respects, the seventh embodiment is the same as the first embodiment, and explanation thereof is omitted here.

The seventh embodiment ensures the same advantages as those of the first embodiment.

Figure 31:
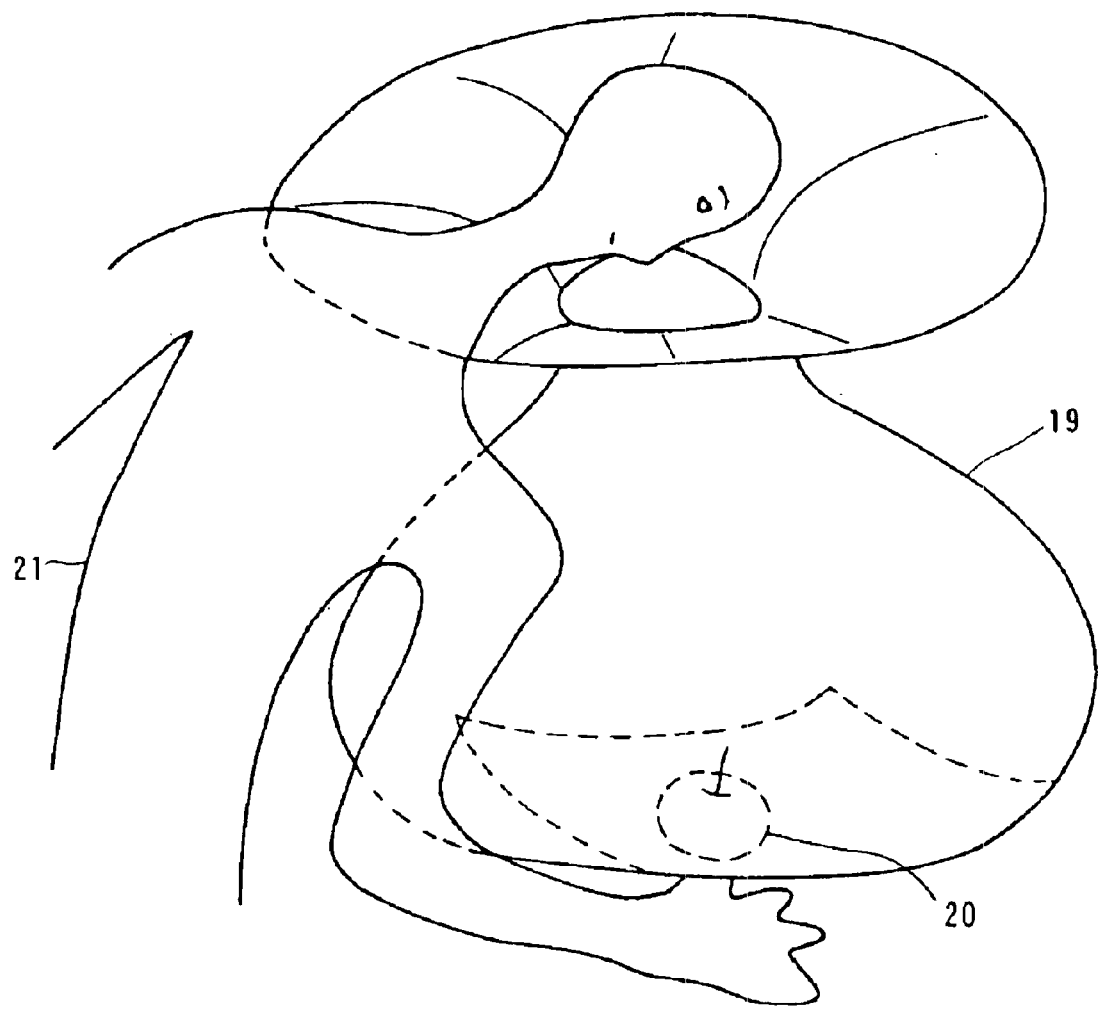
FIG. 31 is a schematic diagram that shows a flat color display having a tactual representation function according to the eighth embodiment of the invention.

FIG. 31 shows a flat color display having a tactual representation function according to the eighth embodiment of the invention.

As shown in FIG. 31, in the eighth embodiment, the flat color display 19 having a tactual representation function is shaped in form of a vase as a whole, using its flexibility.

With the flat color-display 19 having the tactual representation function, in case an image of an apple 20 is displayed on the bottom of the vase, for example, an observer 21 looking into the inside of the vase can not only observe the apple 20 as a three-dimensional object but also touch the peel of the apple as a two-dimensional object.

Having described specific preferred embodiments of the present invention with reference to the accompanying drawings, it is to be understood that the inventions is not limited to those precise embodiments, and that various changes and modifications may be effected therein by one skilled in the art without departing from the scope or the spirit of the invention as defined in the appended claims.

For example, numerical values, structures, materials, source materials, processes and others proposed in the foregoing embodiments are not but mere examples, and different numerical values, structures, materials, source materials and processes and others may be used as well.

More specifically, in the first embodiment, for example, each control signal line 3 has a piezoelectric element structure as a whole; however, the control signal line 3 may have the piezoelectric element structure only at the very intersection with the optical fiber 1 while maintaining the remainder portion as the wiring area.

In the sixth embodiment, although each control signal line 3 is divided into five stripes; however, the divisional number is not limited to this, and may be determined as desired. Additionally, the stripes need not be equal in interval, and it is rather more advantageous to unequalize the intervals of the stripes from the viewpoint of alleviating the directivity of diffraction.

In the seventh embodiment, although the core 1*a* of each optical fiber 1 is made of a liquid containing fine particles 18 dispersed therein, and the fine particles 18 are controlled in position or orientation by an optical field of evanescent light leaking out into the optical fiber 1, the embodiment can be modified to use the same control signal lines in form of piezoelectric elements as those of the first embodiment such that ultrasonic waves generated by each control signal line 3 propagate from the outer circumferential surface of the optical fiber 1 and control positions of the fine particles 18.

Further, in the third embodiment, for example, different kinds of liquid may be used to form cores 16*a* of different olfactory representation fibers 16, respectively, to generate different as many kinds of smells as the number of fibers 16. If the number of pixels corresponds to that of HDTV, approximately 1 million kinds of smells can be produced. Additionally, when different kinds of liquids are used for individual pixels are used to form cores 16*a* of the olfactory representation fibers 16, different kinds of smells can be generated from individual pixels. If the number of pixels corresponds to that of HDTV, approximately one million kinds of smells can be generated.

Further, each tactual representation fiber 2, for example, may be made by using a solid such as plastic as the core 2*a* to interpose a liquid between the cladding 2*b* and the cladding 2*c*. Although this is basically possible also for olfactory representation fibers 16, cores 16*a* are preferably made of a liquid or liquids to facilitate the supply of fragrant source materials.

In lieu of the CCD line sensors 6, photo detectors, for example, may be used as well. Further, although the display will lose flexibility in one direction to a certain extent, porous ceramic may be used as the material of the cladding 2*b* of the tactual representation fiber 2 or the cladding 16*b* of the olfactory representation fiber 16.

As explained above, according to the invention, it is possible to receive and display third sensory information, such as tactual information or olfactory information, in addition to visual information and/or audio information.

Additionally, according to the invention, it is possible to provide an information receiving/display apparatus simple in structure, easy to realize a large-scale information display plane, unlikely to produce distortion along edges of the information display plane during reproduction of a large three-dimensional image when the information display plane is enlarged, quick in response, available for various shapes of the information display plane, including a concave shape, extendible, light, thin and flexible.

What is claimed is:

1. An information receiving/display apparatus configured to receive one of audio information and visual information and to receive one of olfactory information, gustatory information, and tactile information, comprising:
   an information display plane, wherein the information display plane presents the information;
   a plurality of optical fibers or optical waveguides having liquid cores for visual information;
   a plurality of fibers for information for another sensory information having liquid cores;
   a plurality of first control signal lines for visual information extending across said optical fibers or optical waveguides;
   a plurality of second control signal lines for said another sensory information extending across said fibers;
   first piezoelectric elements on outer circumferential surfaces of said optical fibers or optical waveguides at intersections between said optical fibers or optical waveguides and said first control signal lines; and
   second piezoelectric elements on outer circumferential surfaces of said fibers at intersections between said fibers and said second control signal lines,
   wherein the information display plane is configured to display image information by scattering light introduced into said cores from one end or opposite ends of selected one of said optical fibers or waveguides selected in response to image information to be displayed, by means of bubbles that are generated by cavitation brought about in a liquid forming said core by propagating ultrasonic waves from the outer circumferential surface of said optical fiber or optical waveguide by driving said first piezoelectric element at the intersection between selected said optical fiber or optical waveguide and one of said first control signal lines selected in response to said image information to be displayed, and leading out the scattered light externally, and
   wherein the information display plane is configured to form a projection or produce a temperature change on a surface of one of said fibers selected in response to said image information to be displayed, by propagating ultrasonic waves from the outer circumferential surface of selected said fiber by driving one of said second piezoelectric elements at the intersection between selected said fiber and one of one of said second control signal lines selected in response to said image information to be displayed, and/or, said liquid forming said liquid core or molecules of a substance contained in said liquid being emanated from the surface of one of said fibers selected in response to said image information to be displayed.

2. The information receiving/display apparatus according to claim 1 wherein one of said piezoelectric elements at the intersection between selected said fiber and selected said second control signal line is driven to propagate ultrasonic waves from the outer circumferential surface of said fiber and thereby bring about cavitation and generate bubbles in said liquid forming said core, such that a projection is made as representation of tactual information on the surface of said fiber due to a pressure of bubbles.

3. The information receiving/display apparatus according to claim 1 wherein one of said piezoelectric elements at the intersection between selected said fiber and selected said second control signal line to propagate ultrasonic waves from the outer circumferential surface of said fiber to increase the temperature of said liquid forming the core as representation of relative surface temperature information.

4. The information receiving/display apparatus according to claim 1 wherein one of said piezoelectric elements at the intersection between selected said fiber and selected said second control signal line to propagate ultrasonic waves from the outer circumferential surface of said fiber to emanate said liquid forming the core or molecules of a substance contained in said liquid as representation of relative surface humidity information or olfactory information.

5. The information receiving/display apparatus according to claim 1 wherein said optical fibers or optical waveguides have light sources at one-side ends or opposite ends thereof.

6. The information receiving/display apparatus according to claim 5 wherein each of said light sources is a semiconductor laser.

7. The information receiving/display apparatus according to claim 1, wherein said optical fibers or optical waveguides include those for red, those for green and those for blue, said optical fibers or optical waveguides for red having red emitting light sources at one-side ends or opposite ends thereof, said optical fibers or optical waveguides for green having green emitting light sources at one-side ends or opposite ends thereof, and said optical fibers or optical waveguides for blue having blue emitting light sources at one-side ends or opposite ends thereof.

8. The information receiving/display apparatus according to claim 7 wherein said red emitting light sources, said green emitting light sources and said blue emitting light sources are semiconductor lasers.

9. The information receiving/display apparatus according to claim 1 wherein said optical fibers, or optical waveguides, and said fibers are arranged to form a concave plane as a whole.

10. An information receiving/display apparatus configured to receive one of audio information and visual information and to receive one of olfactory information, gustatory information, and tactile information, comprising:

an information display plane, wherein the information display plane displays one of the audio information and visual information and displays one of olfactory information, gustatory information, and tactile information;

a plurality of first fibers or waveguides for displaying the visual information on the information display plane;

a plurality of second fibers or waveguides for displaying one of olfactory information, gustatory information, and tactile information;

a plurality of first control signal lines extending across said first fibers or waveguides;

a plurality of second control signal lines extending across said second fibers or waveguides;

first piezoelectric elements on outer surfaces of said first fibers or waveguides at intersections between said first fibers or waveguides and said first control signal lines; and second piezoelectric elements on outer surfaces of said second fibers or waveguides at intersections between said second fibers or waveguides and said second control signal lines.

11. The information receiving/display apparatus according to claim 10 wherein the information display plane displays the tactile information by forming a projection on the display plane.

12. The information receiving/display apparatus according to claim 10 wherein the information display plane displays the olfactory information by releasing vapor from the display plane.

13. The information receiving/display apparatus according to claim 10 wherein the information display plane is configured to display visual information on one of said first fibers or waveguides by scattering light introduced into one of said first fibers or waveguides by means of bubbles that are generated by cavitation brought about in a liquid forming said core by propagating ultrasonic waves from an outer surface of one of said first fibers or waveguides by driving one of said first piezoelectric elements at the intersection between one of selected said first fibers or waveguides and one of said first control signal lines.

14. The information receiving/display apparatus according to claim 10 wherein the information display plane is configured to form a projection or produce a temperature change on a surface of one of said second fibers or waveguides in response to one of said olfactory information, gustatory information, and tactile information, by propagating ultrasonic waves from an outer surface of one of said second fibers or waveguides by driving one of said second piezoelectric elements at the intersection between one of said second fibers or waveguides and one of said second control signal lines.

15. The information receiving/display apparatus according to claim 10 wherein the information display plane is configured to form a projection or produce a temperature change on a surface of one of said second fibers or waveguides by means of bubbles that are generated by cavitation brought about in a liquid forming said core by propagating ultrasonic waves from an outer surface of one of said second fibers or waveguides by driving one of said second piezoelectric elements at the intersection between one of selected said second fibers or waveguides and one of said second control signal lines.

16. The information receiving/display apparatus according to claim 10 wherein a projection is formed on one of said second fibers or waveguides.

17. The information receiving/display apparatus according to claim 10 wherein vapor is released from one of said second fibers or waveguides.

* * * * *